United States Patent
Arms et al.

(10) Patent No.: US 7,719,416 B2
(45) Date of Patent: May 18, 2010

(54) ENERGY HARVESTING, WIRELESS STRUCTURAL HEALTH MONITORING SYSTEM

(75) Inventors: Steven W. Arms, Williston, VT (US); Chris Pruyn Townsend, Shelburne, VT (US); David Lawrence Churchill, Burlington, VT (US); Michael John Hamel, Essex Junction, VT (US)

(73) Assignee: MicroStrain, Inc., Williston, VT (US)

( * ) Notice: Subject to any disclaimer, the term of this patent is extended or adjusted under 35 U.S.C. 154(b) by 564 days.

(21) Appl. No.: 11/518,777

(22) Filed: Sep. 11, 2006

(65) Prior Publication Data
US 2008/0036617 A1      Feb. 14, 2008

Related U.S. Application Data

(60) Provisional application No. 60/715,987, filed on Sep. 9, 2005, provisional application No. 60/798,570, filed on May 8, 2006.

(51) Int. Cl.
G08B 1/08     (2006.01)
G08B 23/00    (2006.01)
G08B 13/00    (2006.01)

(52) U.S. Cl. ............ 340/539.1; 340/506; 340/517; 340/521; 340/566; 340/693.1; 340/429; 340/539.3; 340/539.13; 340/693.4; 340/683; 307/151; 310/339; 702/33; 702/42; 702/187

(58) Field of Classification Search ............ 340/539.1, 340/429, 539.3, 683; 703/33, 42, 187
See application file for complete search history.

(56) References Cited

U.S. PATENT DOCUMENTS

| | | | |
|---|---|---|---|
| 4,850,552 A | 7/1989 | Darden | |
| 5,381,136 A * | 1/1995 | Powers et al. | 340/539.26 |
| 6,292,108 B1 * | 9/2001 | Straser et al. | 340/870.11 |
| 6,529,127 B2 | 3/2003 | Arms | |
| 6,834,436 B2 | 12/2004 | Townsend | |
| 7,081,693 B2 | 7/2006 | Hamel | |
| 7,098,784 B2 * | 8/2006 | Easley et al. | 340/539.13 |
| 7,135,976 B2 * | 11/2006 | Neff et al. | 340/572.1 |
| 7,143,004 B2 | 11/2006 | Townsend | |
| 2003/0234730 A1 | 12/2003 | Arms | |
| 2005/0017602 A1 | 1/2005 | Arms | |
| 2005/0210340 A1 | 9/2005 | Townsend | |
| 2006/0213278 A1 | 9/2006 | Arms | |

(Continued)

OTHER PUBLICATIONS

Discenzo et al, "Intelligent Sensor Nodes Enable a New Generation of Machinery Diagnostics and Prognostics, New Frontiers in Integrated Diagnostics and Prognostics," 55th Meeting of the Society for Machinery Failure Prevention Technology, Virginia Beach VA, Apr. 2001.

(Continued)

*Primary Examiner*—Donnie L Crosland
(74) *Attorney, Agent, or Firm*—James Marc Leas

(57) ABSTRACT

A method of maintaining a structure includes providing a structure having a component subject to failure. A sensor, a memory and an energy harvesting device are mounted on the structure. The sensor is used and data derived from the sensor logged in the memory, wherein the memory is powered solely with energy derived from the energy harvesting device. The component is replaced if information in the memory shows that the component was subject to damaging usage.

98 Claims, 16 Drawing Sheets

U.S. PATENT DOCUMENTS

2006/0254365 A1    11/2006    Hamel

OTHER PUBLICATIONS

Weiss, "An Advanced Strain Level Counter for Monitoring Aircraft Fatigue," Instrument Society of America, ASI72212, pp. 105-108, 1972.

Roundy et al, "Energy Scavenging for Wireless Sensor Networks with Special Focus on Vibrations," Kluewer Academic Press, 2004.

Paradiso et al, "Energy Scavenging for Mobile and Wireless Electronics," Pervasive Computing, IEEE ComSoc, vol. 1536-1268, pp. 18-26, 2005.

El-Bakry, Component Tagging & Tracking—An Essential Enabling Technology for Effective 'Safe Life' Structural Monitoring, proc. 5th Intl. Workshop on Structural Health Monitoring, Stanford, CA, Sep. 12-14, 2005.

Churchill et al, "Strain Energy Harvesting for Wireless Sensor Network," proc. SPIE's 10th Int'l Symposium on Smart Structures & Materials, San Diego, CA, paper presented Mar. 2003.

Arms et al, "Power Management for Energy Harvesting for Wireless Sensors," proc SPIE's Symposium on Smart Structures & Materials, San Diego, CA Mar. 2005.

Arms et al, "Energy Harvesting Wireless Sensors for Helicopter Damage Tracking," accepted for presentation at AHS 2006, Health & Usage Monitoring Systems (HUMS), Phoenix, AZ, May 9-11, 2006.

Moon et al, "Fatigue Life Reliability Based on Measured Usage, Flight Loads, & Fatigue Strength Variations," AHS 52nd Annual Forum, Washington, DC Jun. 4-6, 1996.

Arms et al, "Scalable, Wireless Structural Testing System," Aerospace Testing Expo 2005 North America, Open Technology Forum, Long Beach, CA, Nov. 7-11, 2005.

Arms et al, "Vibration Energy Harvesting for Wireless Health Monitoring Sensors," Proc Sructural Health Monitoring 2005, pp. 1437-1442, Stanford, CA, Sep. 2005.

El-Sheimy et al, Report on Kinematic and Integrated Positioning Systems, FIX XXII Int'l Congress, Washington, DC, Apr. 19-26, 2002.

Arms et al, "Wireless Strain Sensing Networks," 2nd European Workshop on Structural Health Monitoring, Munich, Germany, Jul. 7-9, 2004.

Measurements Group Inc., "Strain Gage Based Transducers; Their Design and Construction," pp. 25-28, 1988.

* cited by examiner

Energy Harvesting Demonstration.
Output Power vs. Frequency and Applied Strain

ENERGY HARVESTING, WIRELESS STRUCTURAL HEALTH MONITORING SYSTEM

RELATED APPLICATIONS AND PRIORITY

This application claims priority of Provisional Patent Application No. 60/715,987, filed Sep. 9, 2005 and Provisional Patent Application No. 60/798,570, filed May 8, 2006, both of which are incorporated herein by reference.

This application is related to the following commonly assigned patent applications:

"Robotic system for powering and interrogating sensors," U.S. patent application Ser. No. 10/379,224 to S. W. Arms et al, filed Mar. 5, 2003 ("the '9224 application").

"Wireless Vibrating Strain Gauge for Smart Civil Structures," U.S. patent application Ser. No. 11/431,194 to M. Hamel, filed May 10, 2006 ("the '194 application").

"Sensor Powered Event Logger," U.S. Provisional Patent Application No. 60/753,481 to D. L. Churchill et al, filed Dec. 22, 2005, ("the '481 application").

"Slotted Bean Piezoelectric Composite," U.S. Provisional Patent Application No. 60/739,976 to D. L. Churchill, filed Nov. 23, 2005, ("the '976 application").

"Method for Integrating an energy harvesting circuit into a PZ element's electrodes," U.S. Provisional Patent Application No. 60/753,679 to D. L. Churchill et al, filed Dec. 21, 2005, ("the '679 application").

"Method for Integrating an energy harvesting circuit into a PZ element's electrodes," U.S. Provisional Patent Application No. 60/762,632 to D. L. Churchill et al, filed Jan. 26, 2006, ("the '632 application").

"Structural Damage Detection and Analysis System," U.S. Provisional Patent Application No. 60/729,166 to M. Hamel, filed Oct. 21, 2005, ("the '166 application").

"Energy Harvesting for Wireless Sensor Operation and Data Transmission," U.S. Pat. No. 7,081,693 to M. Hamel et al., filed Mar. 5, 2003 ("the '693 patent").

"Shaft Mounted Energy Harvesting for Wireless Sensor Operation and Data Transmission," U.S. patent application Ser. No. 10/769,642 to S. W. Arms et al., filed Jan. 31, 2004 ("the '642 application").

"Wireless Sensor System," U.S. patent application Ser. No. 11/084,541 to C. P. Townsend et al., filed Mar. 18, 2005 ("the '541 application").

"Strain Gauge with Moisture Barrier and Self-Testing Circuit," U.S. patent application Ser. No. 11/091,244, to S. W. Arms et al., filed Mar. 28, 2005 ("the '1244 application".

"Miniature Stimulating and Sensing System," U.S. patent application Ser. No. 11/368,731 to J. C. Robb et al., filed Mar. 6, 2006 ("the '731 application").

"Miniaturized Wireless Inertial Sensing System," U.S. patent application Ser. No. 11/446,637 to D. L. Churchill et al., filed Jun. 5, 2006 ("the '637 application").

"Data Collection and Storage Device," U.S. patent application Ser. No. 09/731,066 to C. P. Townsend et al., filed Dec. 6, 2000 ("the '066 application").

"Circuit for Compensation for Time Variation of Temperature in an Inductive Sensor," Reissue U.S. patent application Ser. No. 11/320,559 to C. P. Townsend et al., filed Dec. 28, 2005 ("the '559 application").

"System for Remote Powering and Communication with a Network of Addressable Multichannel Sensing Modules," U.S. Pat. No. 6,529,127 C. P. Townsend et al., filed Jul. 11, 1998 ("the '127 patent").

"Solid State Orientation Sensor with 360 Degree Measurement Capability," U.S. patent application Ser. No. 10/447,384 to C. P. Townsend et al., filed May 2003 ("the '384 application").

"Posture and Body Movement Measuring System," U.S. Pat. No. 6,834,436 to C. P. Townsend et al., filed Feb. 23, 2002 ("the '436 patent").

All of the above listed patents and patent applications are incorporated herein by reference.

This invention was made with Government support under contracts number N68335-05-C-0217 and N68335-06-C-0218 awarded by the US Department of the Navy. The Government has certain rights in the invention.

FIELD

This patent application generally relates to a system for structural health monitoring and for health usage monitoring. It also relates to sensor devices and to networks of sensor devices with wireless communication links. More particularly it relates to an energy harvesting system for providing power for monitoring structural health and for transmitting data wirelessly.

BACKGROUND

Sensors, signal conditioners, processors, and digital wireless radio frequency (RF) links continue to become smaller, consume less power, and include higher levels of integration. The combination of these elements can provide sensing, acquisition, storage, and reporting functions in very small packages. Such sensing devices have been linked in wireless networks as described in the '127, patent and in the '9224, '194, '481, '541, '731, '637, '066, and '436 applications.

Networks of intelligent sensors have been described in a paper, "Intelligent Sensor Nodes Enable a New Generation of Machinery Diagnostics and Prognostics, New Frontiers in Integrated Diagnostics and Prognostics," by F. M. Discenzo, K. A. Loparo, D. Chung, A. Twarowsk, 55th Meeting of the Society for Machinery Failure Prevention Technology, April 2001, Virginia Beach.

Wireless sensors have the advantage of eliminating wiring installation expense and weight as well as connector reliability problems. However, wireless sensors still require power in order to operate. In some cases, sensors may be hardwired to a vehicle's power system. The wiring required for power defeats the advantages of wireless sensors and may be unacceptable for many applications. In addition, if a power outage occurs, critical data may be lost, at least during the time of the power outage.

Most prior wireless structural monitoring systems have relied on continuous power supplied by batteries. For example, a paper "An Advanced Strain Level Counter for Monitoring Aircraft Fatigue," by Weiss, Instrument Society of America, ASI 72212, 1972, pages 105-108, 1972, described a battery powered inductive strain measurement system which measured and counted strain levels for aircraft fatigue. The disadvantage of traditional batteries, however, is that they become depleted and must be periodically replaced or recharged. This additional maintenance task adds cost and limits use to accessible locations.

Given the limitations of battery power, there has been a need for systems which can operate effectively using alternative power sources. Energy harvesting from vibrating machinery and rotating structures to provide power for such sensing devices and for wireless networks of sensors and/or actuators has been described in the commonly assigned '693 patent and in the '976, '679, '632, '642, and '731 applications.

A paper, "Energy Scavenging for wireless Sensor Networks with Special Focus on Vibrations," by S. Roundy et al., Kluwer Academic Press, 2004, and a paper "Energy Scavenging for Mobile and Wireless Electronics," Pervasive Computing, by J. A. Paradiso & T. Starner, IEEE CS and IEEE ComSoc, Vol 1536-1268, pp 18-26, 2005, describe various strategies for harvesting or scavenging energy from the environment. These sensing systems can operate truly autonomously because they do not require traditional battery maintenance.

However, these energy harvesting systems have not been optimized for use on structures, such as aircraft and for use in certain networks. Thus, an improved system for monitoring is needed that harvests sufficient energy for operation and that can provide data over a network, and this solution is provided by this patent application.

SUMMARY

One aspect of the present patent application is a method of maintaining a structure. The method includes providing a structure having a component subject to failure. A sensor, a memory and an energy harvesting device are mounted on the structure. The sensor is used and data derived from the sensor logged in the memory, wherein the memory is powered solely with energy derived from the energy harvesting device. The component is replaced if information in the memory shows that the component was subject to damaging usage.

Another aspect of the present patent application is a method of operating a structure. The method includes providing a structure having a component subject to component failure. The method also includes mounting a sensor module to the structure for measuring a parameter related to component failure, wherein the sensor module includes a sensor, a wireless communication device and an energy harvesting device. Data is acquired with the sensor and information derived from the data is provided to the wireless communication device. The wireless communications device is powered solely with energy derived from the energy harvesting device and the wireless communication device transmits the information. The information is used to adjust operation of the structure so as to avoid damaging usage.

Another aspect of the present patent application is a method of operating a structure. The method includes providing a structure having a component subject to component failure; mounting a sensor, a memory and an energy harvesting device on the structure; using the sensor and logging data derived from the sensor in the memory, wherein the memory is powered solely with energy derived from the energy harvesting device; and using information in the memory to adjust operation of the structure so as to avoid damaging usage.

Another aspect of the present patent application is a system comprising, a network of sensor nodes wherein each the sensor node includes a sensor, a processor, a memory, a low power time keeper, a wireless communication device and an energy harvesting device. The processor is connected to receive data derived from the sensor. The memory is connected for storing data derived from the sensor. The low power time keeper connected to periodically provide a signal to wake the processor from a sleep mode. The wireless communication device is connected for communicating data derived from the sensor. The energy harvesting device connected for harvesting energy to power the processor, the memory, and the wireless communications device.

Another aspect of the present patent application is a structure, comprising a wireless instrumented structural component including a first sensor, a second sensor, a processor, a transmitter, and an energy harvesting device. The first sensor is for measuring a first property related to structural load in the structural component. The second sensor is for measuring a second property related to structural load in the structural component. The first property differs from the second property. The transmitter is connected to provide load data for the structural component. All power for operating the transmitter is derived from the energy harvesting device. The processor is connected to receive an output derived from the second sensor for verifying operation of the first sensor.

Another aspect of the present patent application is a method of using a structure, comprising providing a wireless instrumented structural component mounted to the structure, the wireless instrumented structural component including a first sensor, a second sensor, a transmitter, and an energy harvesting device. The first sensor is for measuring a first property related to structural load in the structural component. The second sensor is for measuring a second property related to structural load in the structural component. The first property differs from the second property. Data from the first sensor is compared with data from the second sensor to determine that the first sensor is operating properly. Energy from the energy harvesting device is provided wherein all power for operating the transmitter is derived from the energy harvesting device. Data about structural load in the structural component is wirelessly transmitted.

Another aspect of the present patent application is a sensing device, comprising an inertial sensor and a GPS, the inertial sensor integrated with the GPS, wherein all power for operation of said inertial sensor is provided from energy harvesting.

Another aspect of the present patent application is a sensing system comprising a base station, a first plurality of sensors, and a second plurality of sensors. The first plurality of sensors are connected to the base station on a wired network. The second plurality of sensors are connected to the base station on a wireless network.

Another aspect of the present patent application is a method of estimating time before failure of a component of a structure. The method includes providing the structure having the component; instrumenting the structure with a sensor and a memory, the sensor to measure a parameter related to the structure, the memory for logging data derived from the sensor; providing an energy harvesting device on the structure, the energy harvesting device connected to provide all power for powering logging data; providing a model of the component subject to failure; entering information derived from the data into the model; and using the model and the information to estimate a parameter related to time before failure of the component.

Another aspect of the present patent application is a method of collecting information about a structure, The method includes providing an instrumented component including a sensor, a memory, and an energy harvesting device, wherein the component is an integral part of a structure when installed in the structure, wherein the instrumented component includes packaging to protect the sensor, the memory, and the energy harvesting device; installing the component in the structure; and using energy derived from the energy harvesting device to provide power for logging data in the memory.

Another aspect of the present patent application is a method of maintaining a structure. The method includes providing a structure having a component subject to component failure; mounting a sensor, a memory and an energy harvesting device on the structure; using the sensor and logging data derived from the sensor in the memory, wherein the memory is powered solely with energy derived from the energy harvesting device; and logging data at a rate depending on amount of energy harvested by the energy harvesting device.

BRIEF DESCRIPTION OF THE DRAWINGS

The foregoing will be apparent from the following detailed description as illustrated in the accompanying drawings, in which:

FIG. 15b is a side view of the pitch link of FIG. 15a.

DETAILED DESCRIPTION

Figure 1:
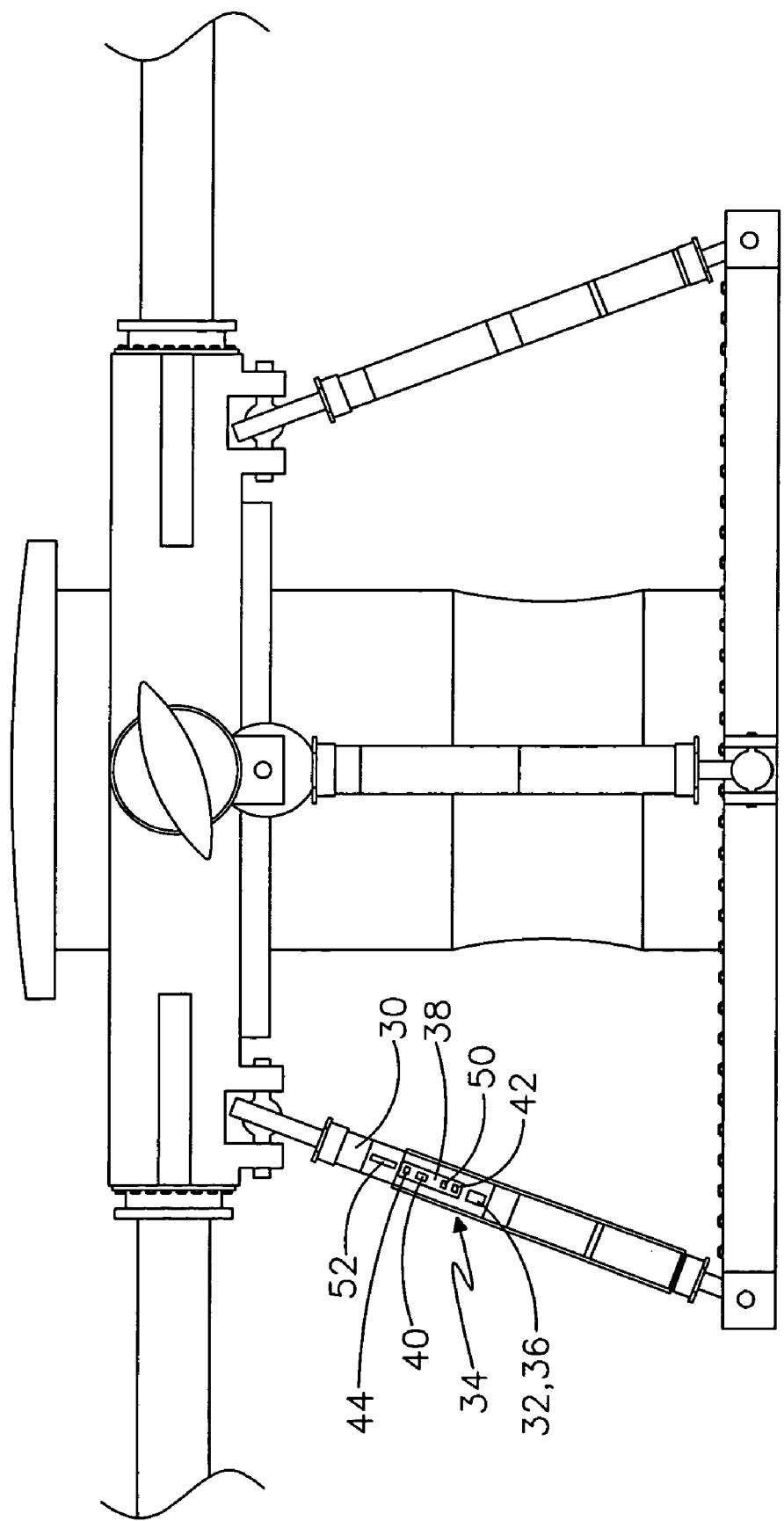
FIG. 1 is a three dimensional view of a helicopter pitch link instrumented with energy harvesting, sensing, data storage and wireless communications.

Mathematical models, such as finite element models of a structure can be used to provide estimates of time before structural component fatigue. Such estimates are improved when their boundary conditions and input loads are based on actual data obtained during operation of the structure that may be collected by instrumented components mounted on the structural component. Such smart components provide a significant benefit in allowing engineers and owners of vehicles to obtain better estimates of the remaining life of critical components.

Structural component fatigue information can be used for condition based maintenance (CBM). With CBM, parts are repaired, maintained, or replaced based on their actual condition, rather than, for example, on the number of total flight hours they may have logged or the number of miles they may have been driven. CBM saves both time & money, since maintenance crews only work on those parts that need maintenance, when they need maintenance.

The data from smart components can also be used to reduce the cost of spare parts inventories because spares are ordered based on their actual usage rates and the improved estimate of remaining life. Failures due to fatigue can also be avoided by timely replacing components that have experienced severe loads based on actual measurement of the live loads and by continuous recording of the load histories and severity of usage over time.

In addition, warnings can be automatically issued to the operator of the vehicle when potentially damaging maneuvers are made, or when the operator is subjecting the vehicle to severe usage. This warning can be used to train operators so that the wear and tear is reduced to the minimum required by the mission. This warning can also lead to safer operation of the vehicle, and potentially to a reduced number of fatalities and injuries to vehicle occupants.

The present applicants then provided various embodiments of a structural monitoring system capable of providing data including dynamic & static vehicle strain, loading, temperature, location, and orientation information. The structural monitoring system they provide takes data from sensors, such as strain gauges, accelerometers, and thermocouples recorded along with data from inertial sensors, such as gyroscopes and accelerometers. In addition data from the Global Positioning System (GPS) can be included. Both inertial sensors and GPS can provide accurate pitch, roll, and yaw information about the vehicle. The various embodiments include wireless communication, energy harvesting, and schemes for low power operation.

A way to obtain this structural monitoring information from a large number of sensors that can be deployed in arrays to provide information over wide areas of a structure is provided. For example the sensors can be placed at different positions on the vehicle and the sensors can communicate over a wired or over a wireless network. The network is scalable, meaning a large number of sensor nodes can be included in the network.

A way to power each of the sensor nodes without requiring connection to a wall outlet and without having to periodically replace batteries is also provided. Integrated in each of the sensor nodes can be a device that harvests energy from an available environmental source, such as vibration or strain energy. The integrated energy harvesting wireless sensing nodes in the scalable, wireless network provide substantial improvement to previously available structural health monitoring systems (SMS).

Ways to substantially reduce power consumed by each of the sensor nodes so as to enable long battery life or so as to enable perpetual operation with power available from energy harvesting are also provided.

The advances provided in the present patent application break down significant barriers to structural health monitoring. The scalable wireless network eliminates costly wire runs to strain gauges and other sensors and enable placing sensors on rotating parts and in other wise inaccessible locations. Energy harvesting eliminates the need for battery maintenance. Inertial sensors with GPS support provides important vehicle velocity, location, and orientation data, with enhanced accuracy compared to that of an inertial sensing system (ISS) alone. In addition, as further described herein below, the wireless network for external communications can be used in conjunction with wired communication to local sensors or other devices. In one embodiment a high speed networked wired CAN bus standard communication scheme is used to provide both power to inertial sensors and data acquisition from the inertial sensors using a multi-drop network.

The system architecture of the present patent application allows for flight tests to be performed with a range of wireless and wired networked sensing nodes. The wireless nodes may be deployed to monitor the loads on the rotating components of helicopters, for example. Wired and wireless nodes may also be used for fatigue monitoring on non-rotating components, such a fixed wing aircraft. Other types of aircraft, land vehicles, and water craft could also benefit from the capability to autonomously track and assess structural damage "on the fly."

Time stamped load data from key structural elements (collected by the wireless sensing nodes), combined with pitch, roll, and yaw information (collected by the ISS/GPS) is then gathered by an on-vehicle gateway. This allows time slices to be made through all the data, for example at peaks in the inertial data when the stresses are greatest. This time sliced information can be used for flight regime recognition.

The present applicants found that by providing data logging and data analysis capability on-board, the vehicle becomes "self-aware" and can assess and record severity of its own usage and its usage history. This information can be used for condition based maintenance on every vehicle in a fleet, providing for example, information on the fatigue rates of each vehicle's structure and rotating components. If combined with component tagging and tracking operators and maintenance and repair organizations can use the SMS data obtained from actual severity of usage and actual operating load measurements, as determined using the techniques of the present patent application, to automatically update the status of the life-limited parts[1]. The information can also be used in health usage monitoring systems (HUMS).

[1] El-Bakry, M., Component Tagging & Tracking—An Essential Enabling Technology for Effective 'Safe Life' Structural Monitoring, Proceedings of 5th Intl. Workshop on Structural Health Monitoring, Stanford, Calif., Sep. 12-14, 2005

The present applicants have created working prototypes for a wireless network of sensor nodes, each of which harvests energy from available strain energy or vibration energy. The miniature, energy harvesting wireless nodes of the present patent application allow sensors to be located in areas that are currently not instrumented, such as on rotating or moving components as well as in remote, inaccessible areas. The present applicants used both single crystal PZT and PZT fibers in their energy harvesting prototypes. One system uses a tuned flexural element for vibration energy harvesting, while the other system harvests strain energy directly from a vibrating (cyclically straining) composite beam[2]. In both schemes, applicants demonstrated that sufficient energy could be harvested to power a wireless strain sensor transceiver[3]. They also adapted their energy harvesting sensor systems for damage tracking on aboard helicopters and demonstrated that the operational strains in the helicopter's control rod (or "pitch link") generate enough power to allow continuous, wireless operational load monitoring of this critical structure, even during conditions of straight and level flight when the least amount of strain energy is available for harvesting.[4]

[2] Churchill, D. L., Hamel, M. J., Townsend, C. P., Arms, S. W., "Strain Energy Harvesting for Wireless Sensor Networks", proc. SPIE's 10th Int'l Symposium on Smart Structures & Materials, San Diego, Calif., paper presented March 2003
[3] Arms, S. W., Churchill, D. L., Townsend, C. P., Galbreath, J. H.: "Power Management for Energy Harvesting Wireless Sensors", proc. SPIE's Symposium on Smart Structures & Materials San Diego, Calif. March 2005
[4] Arms, S. W., Townsend, C. P., Churchill, D. L., Moon, S. M., Phan, N., "Energy Harvesting Wireless Sensors for Helicopter Damage Tracking", accepted for presentation at AHS 2006, Health & Usage Monitoring Systems (HUMS), Phoenix, Ariz., May 9-11, 2006

Pitch links are critical rotating elements on helicopters, and are very difficult to monitor with existing technologies, such as slip rings. Pitch link loads in the Sikorsky H-60 have been found to vary strongly with flight regimes: during pull-ups & gunnery turns, the loads were measured at approximately eight times that of straight & level flight[5].

[5] S. Moon, D. Menon, G. Barndt, Fatigue Life Reliability Based on Measured Usage, Flight Loads, & Fatigue Strength Variations, Am. Helicopter Society 52nd Annual Forum, Washington, D.C., Jun. 4-6, 1996

Therefore, pitch link loads are a good indicator of helicopter usage severity. Pitch link loads are high, typically in the range of 1600 lbs in static compression accompanied by +/−7800 lbs of cyclic (dynamic) loading. The present applicants found that strain gauges placed strategically on the pitch link can directly measure both static and dynamic loads, while canceling out thermal errors. They also found that they could use energy harvesting methodologies to convert the pitch link's dynamic strains into power to completely eliminate the need for battery maintenance.

A representational image of the energy harvesting pitch link 30 with surface mounted strain/load sensors 32 and support instrumentation 34 is provided in FIG. 1. Environmental protection for sensors 32 and instrumentation 34 mounted on pitch link 30 is shown as transparent in this illustration. Sensors 32 includes piezoresistive strain gauge 36. Instrumentation 34 includes circuit board 38 that includes microprocessor 40, rechargeable electrochemical battery 42, and RF transceiver 44. Instrumentation 34 also includes piezoelectric energy harvesting elements 50, and RF antenna 52. Instrumentation 34 can be protected with electrical insulation, EMI shielding and a protective cover, not shown.

In order to perfect a sensing solution which exploits energy harvesting, the power consumed by all of the system's components (sensor, conditioner, processor, data storage, and data transmission) must be compatible with the energy harvesting strategy and the available power levels it can provide. Obviously, minimizing the power required to collect and transmit data correspondingly reduces the demand on the power source. Therefore, minimizing power consumption is as important a goal as maximizing power generation. The present applicants have successfully minimized power consumption by 1. placing the sensing nodes in micropower sleep mode as much as possible, 2. reducing the duration and frequency of radio frequency (RF) communications, and 3. reducing the sensor's sampling rates to the minimum required by the application.

Figure 2:
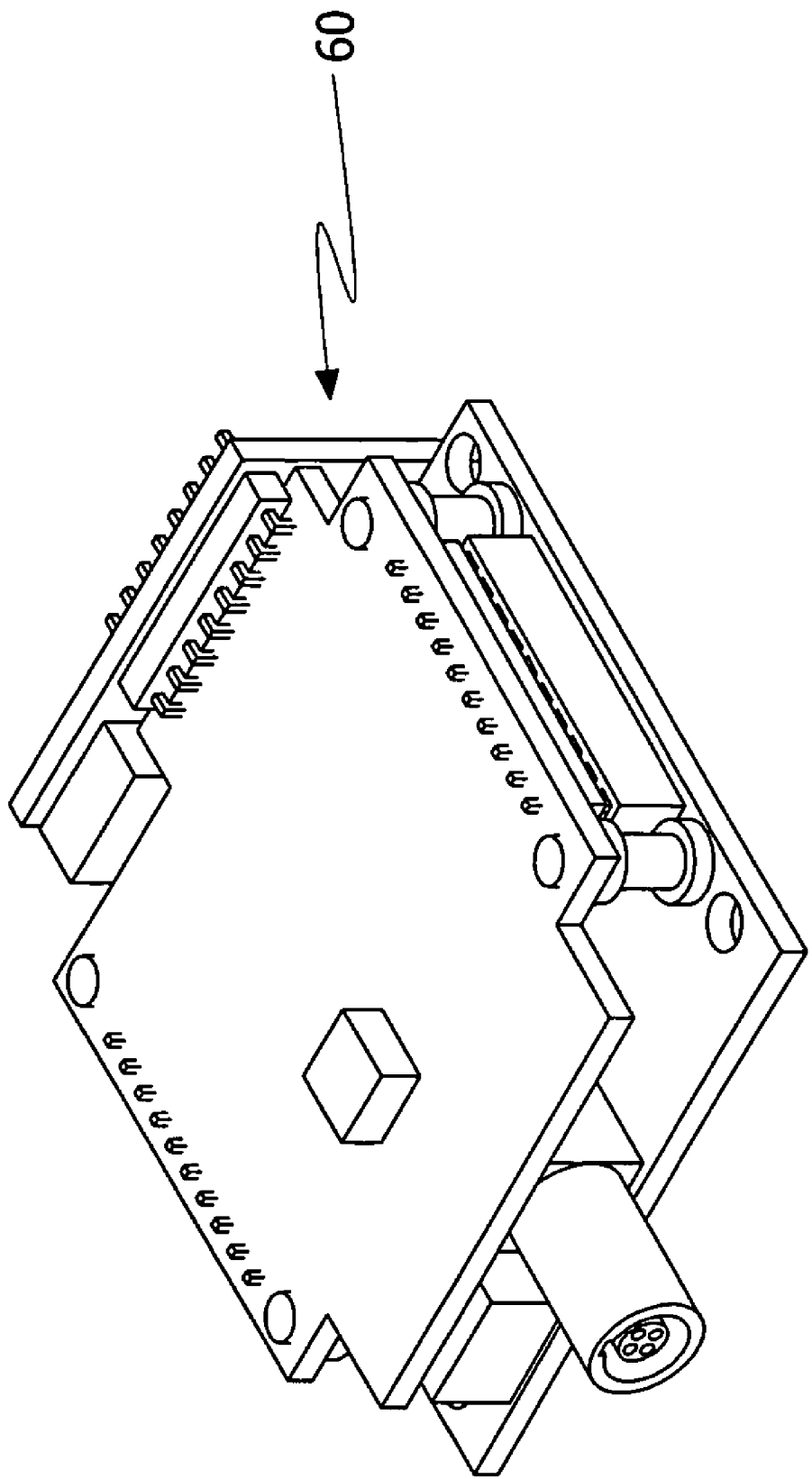
FIG. 2 is a three dimensional view of a triaxial inertial sensing suite including sensors for measuring pitch, roll, and yaw.

Integrated inertial & magnetic sensor triaxial suite 60, called 3DM-GX1®, available from Microstrain, Inc., Williston, Vt. http://microstrain.com/3dm-Ex1.aspx is illustrated in FIG. 2. This 3DM-GX1® device combines three angular rate gyros with three orthogonal DC accelerometers, three orthogonal magnetometers, multiplexer, 16 bit A/D converter, and embedded microcontroller, to output its orientation in dynamic and static environments.

Operating over the full 360 degrees of angular motion on all three axes, 3DM-GX1® provides orientation in matrix, quaternion and Euler formats. The digital serial output can also provide temperature compensated, calibrated data from all nine orthogonal sensors at update rates of 350 Hz.

Networks of 3DM-GX1® nodes can be deployed by using the built-in RS-485 network protocol. Embedded microcontrollers relieve the host system from the burden of orientation calculations, allowing deployment of dozens of 3DM-GX1® nodes with no significant decrease in system throughput.

Output modes and software filter parameters are user programmable. Programmed parameters and calibration data are stored in nonvolatile memory.

Using this device, data concerning structural performance can be collected and transmitted without human intervention and without need for connectivity to the vehicle's flight computers.

Figure 3:
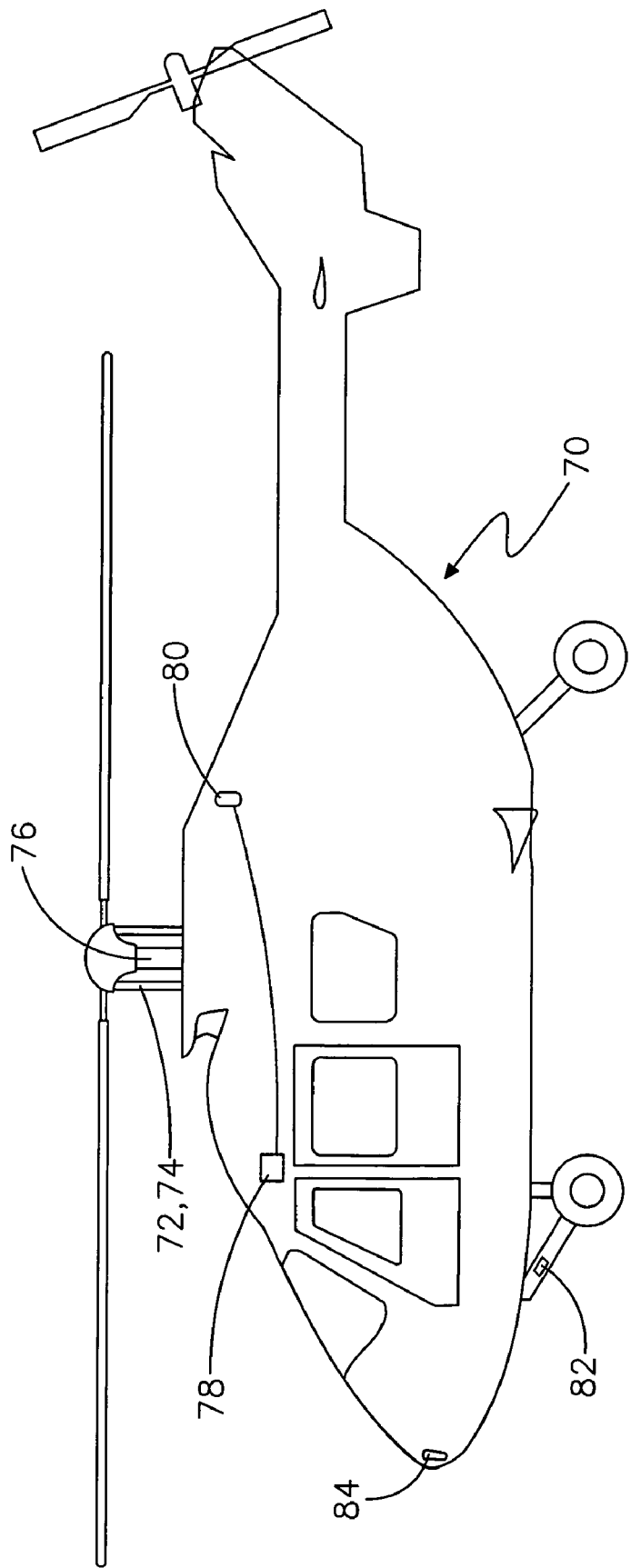
FIG. 3 is a three dimensional view of a helicopter instrumented with energy harvesting, data storage, wireless communications and sensors, including load and strain sensors on the pitch link, a shaft torque, RPM, and power sensing node mounted on the drive shaft of the rotor, a GPS that can be wired or wirelessly connected, wireless landing gear load sensor and a wireless airspeed sensor.

An embodiment of a wireless sensing system combined with inertial sensing and GPS to provide a flexible monitoring system for helicopter 70 is illustrated in FIG. 3. The system includes wireless energy harvesting load and strain sensors 72 mounted on the pitch link 74 of helicopter 70 along with drive shaft torque, RPM, and power sensors 76. Other sensors, such as an inertial sensing suite of triaxial accelerometers, rate gyros, and magnetometers, with GPS input 78 and GPS antenna 80 can be deployed. Wireless landing gear load sensing 82 and wireless airspeed sensing 84 can be deployed as well.

The sensors can have wireless network connection or vehicle bus network connection.

The miniature electronics modules are designed to support sensing and RF communications at microwatt energy levels. This enables their use with strain and vibration energy harvesting systems the present applicants have demonstrated. The present applicants have also demonstrated wireless sensing nodes that support other sensors, such as conventional strain gauges and thermocouples[6].

[6] Arms, S. W., Townsend, C. P., Churchill, D. L., Moon, S. M., Phan, N., "Energy Harvesting Wireless Sensors for Helicopter Damage Tracking", accepted for presentation at AHS 2006, Health & Usage Monitoring Systems (HUMS), Phoenix, Ariz., May 9-11, 2006

The strain gauge nodes are capable of peak valley compression and fatigue calculation using embedded rainflow algorithms[7]. This versatility allows the wireless sensing network to be tailored to best meet an aircraft's specific monitoring requirements, and facilitates their use on aging aircraft, where it is best not to disturb the existing wiring. Furthermore, the nodes' embedded software may be wirelessly upgraded to allow enhancements to the damage detection algorithms and structural interrogation protocols in the future.

[7] Arms, S. W., "Scaleable, Wireless Structural Testing System", Aerospace Testing Expo 2005 North America, Open Technology Forum, Long Beach, Calif., Nov. 7-11, 2005

Figure 4:
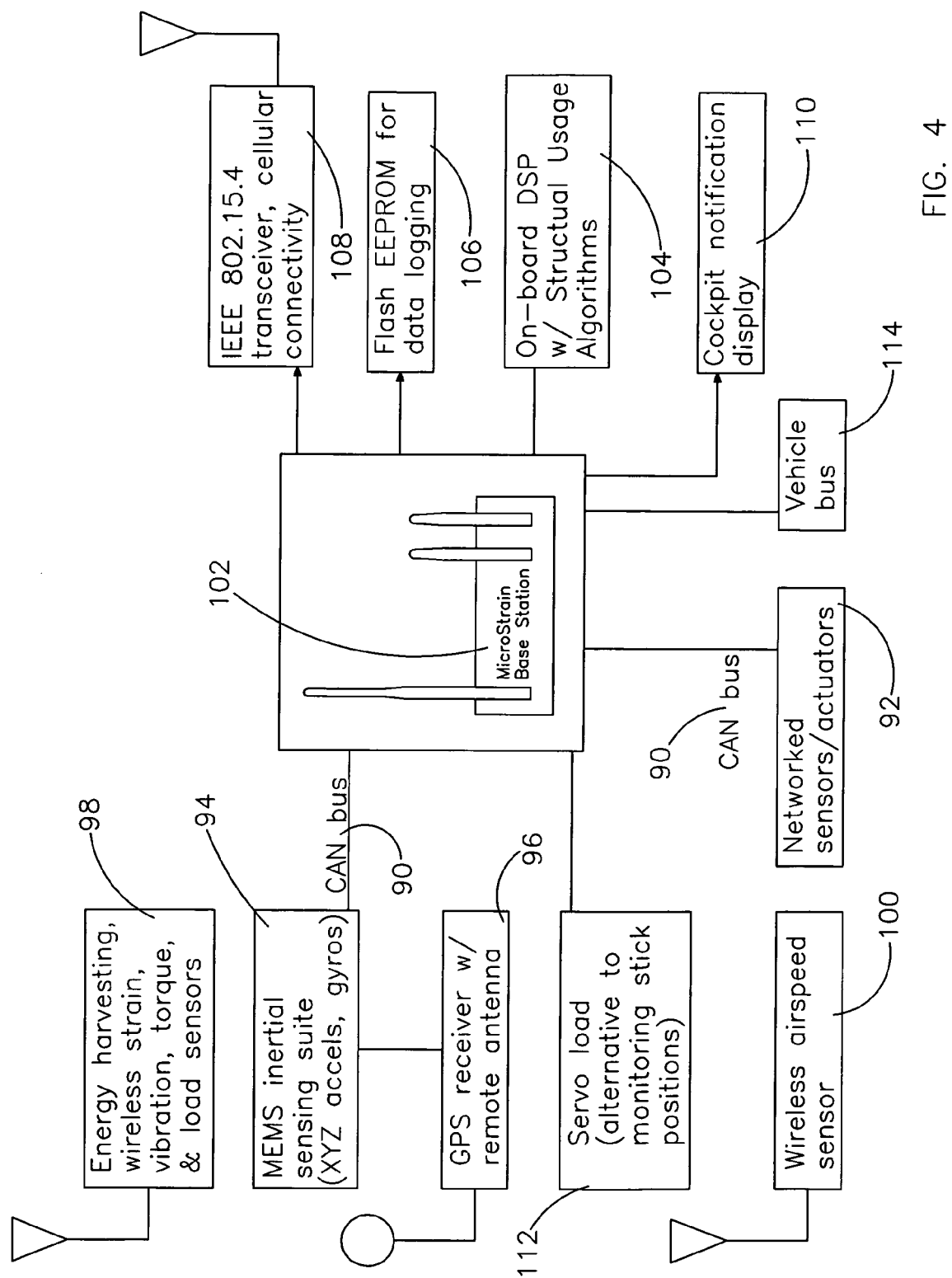
FIG. 4 is a block diagram of an energy harvesting, wireless structural health monitoring system.

Standard open architecture communications for an embodiment of a structural health monitoring system is shown in the block diagram in FIG. 4. This system provides support for hard-wired digital CAN bus 90 for networked sensors and actuators 92, 94 and GPS receiver 96. It also provides support for digital wireless communications for other sensors, such as wireless strain, vibration, torque and load sensors 98, which obtain their power for acquiring, processing, and transmitting data from energy harvesting. Wirelessly communicating airspeed sensor 100, can also submit its data. Both the wired and the wireless sensors and actuators are connected to base station 102 which can include a processor and/or an on-board digital signal processor 104 which runs structural usage algorithms. Also connected to base station 102 are flash EEPROM 106 for logging data, IEEE 802.15.4 transceiver 108 and display 110 which can be located, for example, in the cockpit of the aircraft. To get a measure of what the flight controls of an aircraft are attempting to make the aircraft's control surfaces do information from servo actuators 112 is provided to base station 102. From vehicle bus 114 a large amount of data can be provided to base station 102, including engine temperatures and pressures, and remaining fuel.

Operating requirements for the wireless sensing node's are listed in Table I.

TABLE I

Wireless sensing node Specifications

| Parameter | Typical | Units |
|---|---|---|
| Operating temperature range | −55 to +85 | Degrees C. |
| On board temperature measurement range | −55 to 85 | Degrees C. |
| Humidity range | 0 . . . 100 | % RH |
| Differential sensor inputs | 3 bridge sensors inputs (supports sensor types including strain gages, accelerometers, pressure sensors, & load cells), 1 temperature sensor | n/a |
| Differential input gains | Software programmable 10-10,000 | V/V |
| Differential input offset adjust | Software programmable +/−100 | mV referred to input |
| Sensor Excitation | DC 3.0 V/50 mA maximum | n/a |
| RF Transmission Frequency | 2.450-2.490 | GHz |
| RF channels | 16 | n/a |
| RF Transmission range | 70 | Meters (line of sight) |
| RF Output power | 0 dBm (1 mW) | n/a |
| RF Modulation Type | Direct Sequence Spread Spectrum | n/a |
| Wireless Data standard | IEEE802.15.4 | n/a |
| Data security encryption | AES-128 | n/a |
| Data acquisition resolution | 16 | bits |
| Max data acquisition rate | 4000 | samples/second |
| Data Storage on standard board | 8 | Megabytes Flash |
| Power required to maintain precision time stamping capability | 2.4 | microwatts |
| Power required to maintain microprocessor sleep timer | 3 | microwatts |
| Power Supply min/max | 3.1/40 | Volts DC |
| Mechanical dimensions of WSN microelectronics | <1.0 × 1.0 | inches |

The wireless sensing node system is a network of wireless energy harvesting miniature sensing elements that allow for acquisition & storage of Wheatstone bridge type sensor data in a package size less then 0.5 cubic inch. For example, vibrating energy harvesting wireless strain gauge electronics integrate the following electronic functional blocks into a microminiature package smaller than 1.0 cubic inch in volume, including
  a) energy harvesting power conversion & storage electronics
  b) programmable precision triaxial strain gauge signal conditioner w/integral self calibration
  c) low power system microprocessor
  d) IEEE802.15.4 direct sequence spread spectrum radio transceiver
  e) Flash memory for local data logging
  f) Nanopower time keeper to activate scheduled datalogging modes Each wireless sensing node 120 includes or interfaces directly to Wheatstone bridge type sensors 122 through programmable sensor signal conditioning 124, multiplexer, instrumentation amplifier, and anti-aliasing filter 126, and A/D converter 128, as shown in the block diagrams in FIGS. 5, 6. Microprocessor 130 manages the data acquisition and storage of data into nonvolatile flash memory 132. Wireless IEEE802.15.4 transceiver 134 is provided for real time data transmission or data download after completion of the test.

Figure 6:
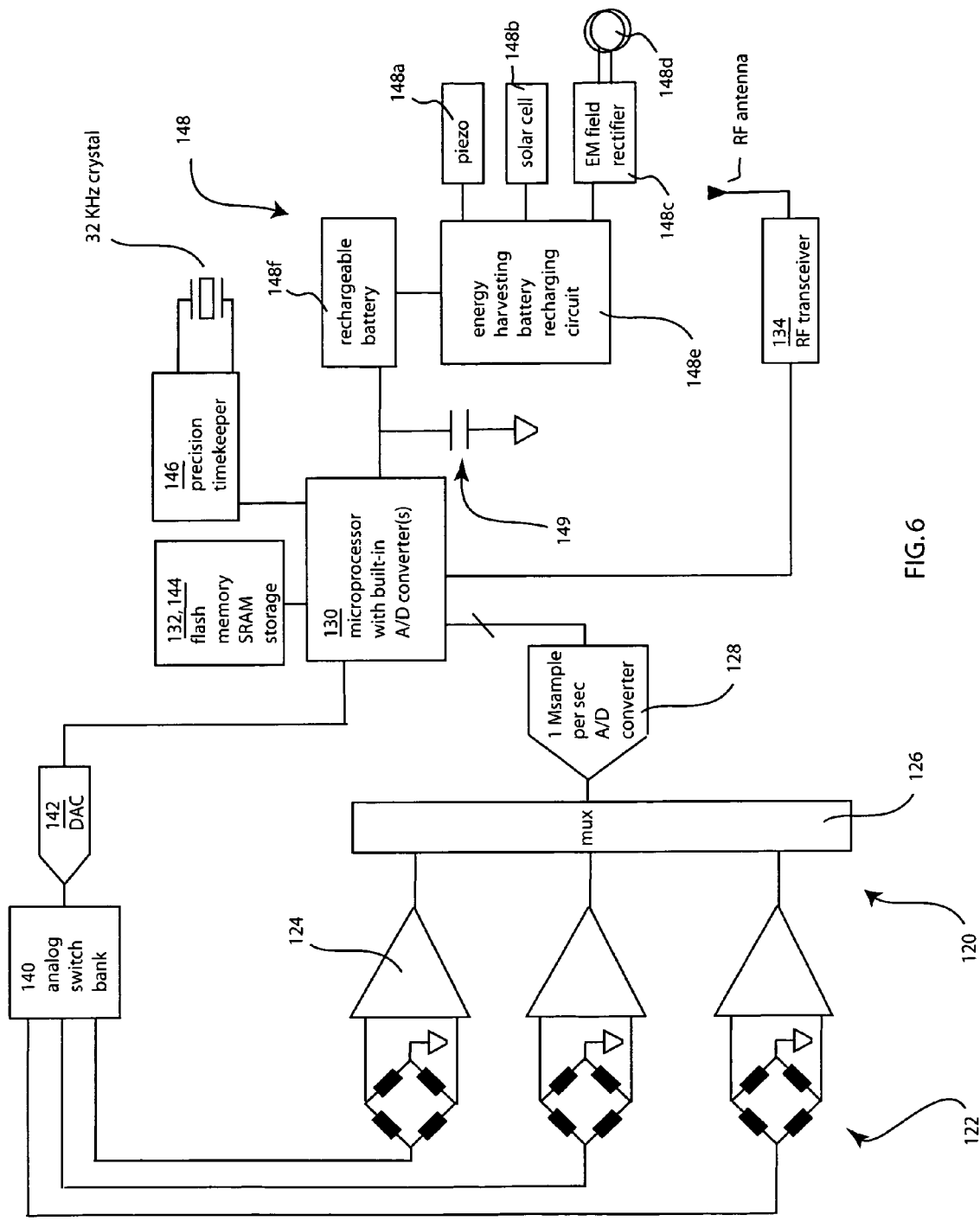
FIG. 6 is another block diagram of an energy harvesting sensing node subsystem.

Embedded microprocessor 130 provides the programmable intelligence to manage data acquisition from embedded sensors 122. Embedded microprocessor 130 will also store configuration and calibration data for the individual sensors and data acquisition channels. As shown in FIG. 6 multiple data acquisition channels can be provided with multiplexing.

The system supports both high level voltage inputs (0-3 Volt inputs) and low level inputs (<100 mV, typical) from sensors, such as bonded foil strain gauges. To support low level inputs a programmable sensor interface (PSI) front end is provided. This front end uses high common mode rejection ratio (CMRR) instrumentation amplifiers to convert the low level voltages produced by most sensors to a high level voltage suitable for the system analog to digital converters (ADC). These instrumentation amplifiers have a digitally programmable gain (DPG) and digitally programmable offset (DGO), allowing any type of sensor that produces an analog voltage output to be used, such as strain gauges, thermocouples, pressure sensors, and accelerometers. Following the instrumentation amplifiers are digitally programmable low pass filters. These filters are used for noise reduction and will also serve as anti aliasing filters for the analog to digital converters. The user is able to adjust all PSI parameters using a software graphical user interface (GUI). Once the appropriate settings have been selected they will be stored in non-volatile memory on the microprocessor. The system microprocessor manages the initialization of all the digitally programmable parameters on startup.

In addition to programmability, the system also has the capability to perform embedded built in test and calibration of the electronics. To facilitate built in test and calibration analog switch 140 is used to switch in known test signals to the device inputs under microprocessor control, allowing the instrument to calibrate both its offset and its gain without user intervention. For the instrumentation amplifiers, the reference calibration signal is accomplished by switching in a known resistance across one leg of the bridge circuit of sensor 122. Switching in a known resistance produces a known voltage shift at the input of the instrumentation amplifier, allowing the system to determine the scale factor of PSI circuit. For the high level 0-3V channels a known precision reference voltage is switched into the input. System offset will be obtained and calibrated by using analog switches to temporarily short the inputs together and measuring the output offset voltage. Once this system gain and offset data is obtained, it will be saved into non volatile memory on the system microprocessor for use when sensor data is collected.

The system uses digital to analog converter (DAC) 142 to provide excitation to the sensors for the calibration. The voltage levels provided by the DACs will be programmable between 0 and 3 volts, and will be able to source up to 50 mA of source current to the sensor load.

Signal Wireless Data Acquisition & Logging of Sensor Data

After the signal from sensor 122 has been amplified and filtered, the signal will be acquired using high speed analog to digital converter (ADC) 128 with programmable conversion rates as high as one megasample/second. The output of this converter is stored in memory using direct memory access (DMA), allowing the high speed capability of the ADC to be preserved. For the highest speed acquisition, the data is fed directly into static random access memory (SRAM) for the duration of the test. The use of SRAM is desirable as it supports high speed acquisition at relatively low power. After the test is completed, the data can be transferred to nonvolatile flash memory 132 and can be downloaded via a wired or wireless interface at a later time. Alternatively, that data can be transmitted in real time over the wireless IEEE802.15.4 interface.

One embodiment uses a memory chip that integrates one megabyte of SRAM and two megabytes of flash memory into a package that measures approximately 6 mm×8 mm. The 16 bit ADC with DMA is integral to the system microcontroller (C8051F061, Silicon Labs, Austin, Texas). The sample rate can be programmable by the user from 100 Hz to 1 MHz. The amount of time that the sensor data is acquired by the burst sampling mode can also be programmable by the user. For a triaxial rosette strain gauge and a flash size of 2 Megabyte, the present applicants found that data can be acquired and stored with burst mode sample rates of 100 kHz for up to 3.4 seconds. For a 100 Hz acquisition rate, burst mode can be continued for 3400 seconds (~56 minutes) before memory is filled and data is download.

Triggering and Time Synchronization

Triggering data acquisition from the sensors can be through a command over a wireless IEEE802.15.4 network using RF transceiver 134 of FIG. 6. For applications that require time synchronization, the trigger packet can include network time synchronization data. For many embedded applications the sensed data acquired by individual structural health monitoring modules can be synchronized in time. Each wireless sensing node module has precision time clock 146 that can be periodically resynchronized over the wireless network using RF transceiver 134. The wireless synchronization method will support time synchronization between remote wireless sensing node modules 120 to a resolution of better than 1 millisecond.

Base station 102 and the inertial sensing suite can also have a real time precision time clock. Further timing information can be derived from the GPS unit which is connected to the inertial sensing suite. This timing information can then be broadcast to the network.

Testing synchronization can be accomplished by providing the same input to each remote wiresless sensing node module 120 of multiple remote wireless sensing nodes modules using a function generator producing a 10 Hz sine wave. Data acquisition is triggered using the trigger data packet, and data collected and stored locally along with a time stamp for each data point. The time stamp is initialized to zero on detection of the synchronization packet. The data is downloaded, and phase lag and synchronization between channels can be documented. The time stamp can include the calendar date and time. The present applicants found that they could provide this information while maintaining extremely low average quiescent currents.

Micropower Timekeeper & Timed Burst Mode Sampling Capabilities

Micropower time keeper 146 is included in the wireless sensing node systems to provide scheduled sampling of sensor data (or scheduled wake up) during conditions of low vibration (or machine downtime). Micropower time keeper 146 (Maxim DS1390, Sunnyvale, Calif.) draws less than 800 na. A small button cell battery may be included to power micropower time keeper 146 to ensure its operation after extended periods of low vibration where energy storage elements may be completely discharged. Thus, timing can be preserved even under such conditions. Alternatively, time can be broadcast to each wireless sensing node. A serial interface for this component for connection to a processor is well known.

In lowest power mode, power to all circuitry on the wireless sensing node printed circuit board (PCB) (except micro power time keeper 146) is completely turned off. DS1390 timekeeper 146 may be programmed to create a single pulse interrupt at a time interval that has been preprogrammed. This interrupt line is routed up to one of the microprocessor's interrupt pins. Upon interrupt, processor 130 wakes up, and depending on the preprogrammed instruction set, it executes one or both of the following:

(1) The wake up may initiate a "sniff" for the presence of the 802.15.4 carrier. If the carrier is present the wireless sensing node program will cause the system to enter into communication mode. The system can then, depending on the communicated commands, cause one or more of the following to happen; the wireless sensing node system will send previously stored data via the 802.15.4 radio link to the requesting base station, and/or the system will accept and self program new parametric data from the requesting base station which can include parameters for the number of data points to be acquired during each sampling, the sampling rate, how many channels to sample, the interval between sampling sessions or the times of day to sample (scheduled sampling), and new gain or offset parameters for the programmable signal conditioners.

(2) The wake up may initiate a data acquire and store sequence. This sequence includes powering up the wireless sensing node acquisition PCB's and starting data acquisition according to a preprogrammed sequence that ends in the data acquired being stored in electrically erasable programmable memory (EEPROM).

After any of the above sequences are completed, wireless sensing node module 120 will power off the acquisition circuitry and then enter sleep mode itself until the next scheduled interrupt occurs. During sleep mode the energy storage elements shall be background recharged by energy harvesting system 148. Energy harvesting system 148 can include piezoelectric transducer 148a, solar cell 148b, as described in the 60/798,570application, and/or electromagnetic field rectifier 148c and inductive coil 148d. It can also include energy harvesting battery recharging circuit 148e, and rechargeable battery 148f. Local storage capacitor for high current pulse power 149 can be included if required by the load, as further described in the '693 patent.

Sampling Modes: To maximize flexibility, vibrating energy harvesting wireless sensor node 120 may support a number of sampling and storage modes, including:

a) real time streaming of wireless strain readings at programmable data rates (from 0.1 Hz-1000 Hz)

b) "burst" mode sampling and storage at very high sample rates (up to 1 MHz) at scheduled time intervals, to be downloaded at a later time.

In the real time streaming mode, sensor 122 is sampled at a fixed rate and the data is transmitted over RF link 134. At low update rates, the power consumption required to do this is extremely low. For example, the present applicants have demonstrated that to sample and transmit data from a 1000 Ohm strain gauge requires just 275 microamps of average supply current (<825 microwatts power) at 3 volts DC when sampling the strain gauge at 40 times per second and transmitting the block of data once per second. As the sample rate increases, the required power also increases.

Burst mode sampling allows for the system to support very high datalogging rates for short periods of time. If the burst mode sampling events are executed at a low duty cycle, then the average power is quite low. Depending on the amount of energy available the system can be programmed to adjust its sampling rate appropriately. For example during conditions when little energy is available to harvest sampling rates can be reduced or sampling can be stopped and available energy can be used to background recharge until such time as enough energy has been stored to take a sample. Alternatively, if the power produced by the energy harvester increases then sampling rate can be automatically increased.

The present applicants found several ways to reduce power consumption. Increasing the bandwidth or frequency response of the sensor signal conditioning chain allowed for faster settling of the sensor signal conditioner, so it can be turned on and off quickly, which minimizes the time required for the sensor to be powered, and hence lowers the overall power requirement of the sensor. Thus, using higher power components can result in energy savings.

Adding a burst mode sampling feature which buffers data for one second prior to sending the data also reduced power consumption. The present applicants found that significant power is used in sending a RF data packet using the standard IEEE802.15.4 packet protocol and advantage from sending one large data packet compared to sending many smaller packets. By buffering and reducing the number of data packets sent per second, they found that power consumption could be greatly reduced. In one sampling mode implemented, the sensor data was digitized at a 40 Hz rate and buffered for one second before data was transmitted to the receiver.

Optimizing the power up sequencing of the amplifiers in the analog signal chain also reduced power consumption, the present applicants found that the analog electronics signal chain would settle faster when they kept the amplifiers out of saturation during their warm up period. They optimized firmware to ensure that the power up sequence minimized the time that the amplifiers were in saturation. For example, if the amplifiers are powered after the sensors the amplifiers are kept out of saturation or the time minimized.

These changes resulted in reducing the power consumption from 21,000 microwatts in our previous low power sampling mode to 975 microwatts, a greater then twenty-fold reduction in power consumption.

Figure 7:
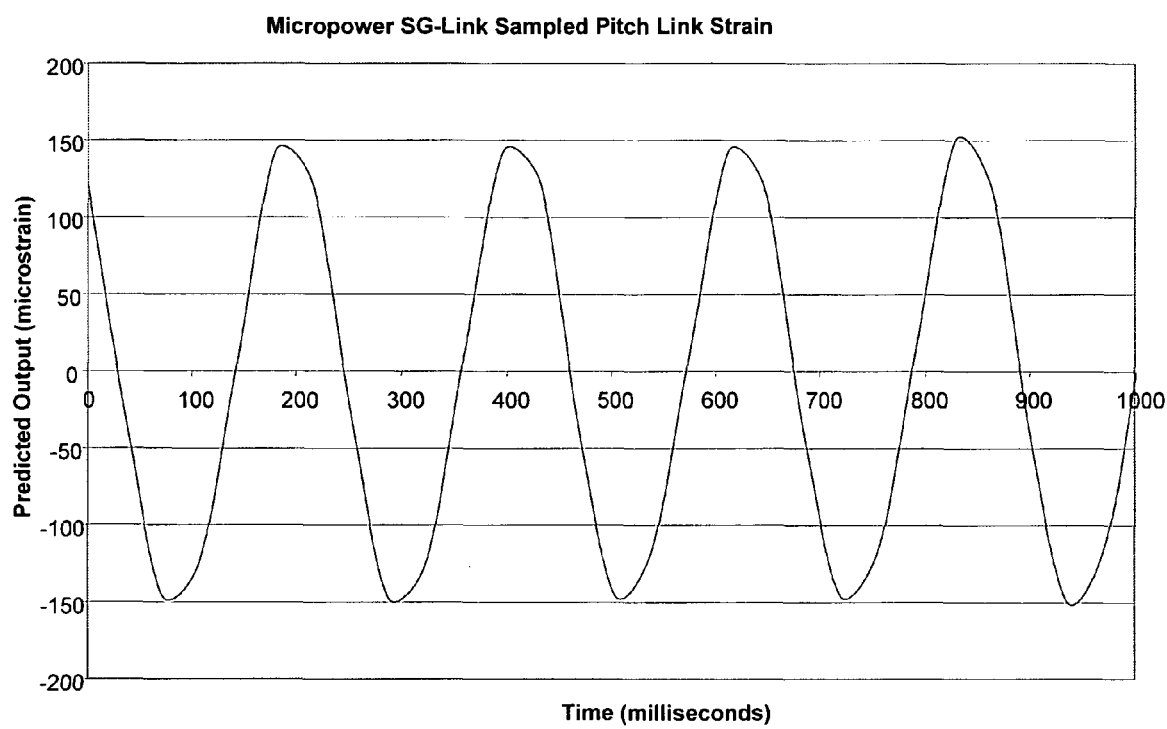
FIG. 7 is data collected in a simulated pitch link experiment.

The wireless strain node was then tested with PZT elements as its sole power source and with an electrodynamic actuator generating simulated pitch link cyclic strains. A conventional 1000 ohm foil type strain gauge (Visay Micro-Measurements), was bonded to the pitch link test specimen. The device was found to be able to sustain sampling and transmitting of strain data at the desired 40 Hz rate for pitch link cyclic strain levels above +/−100 microstrain. Representative data in FIG. 7 shows that sufficient energy is generated to operate the electronics indefinitely without batteries from normal operation of a pitch link on a helicopter.

Figure 8:
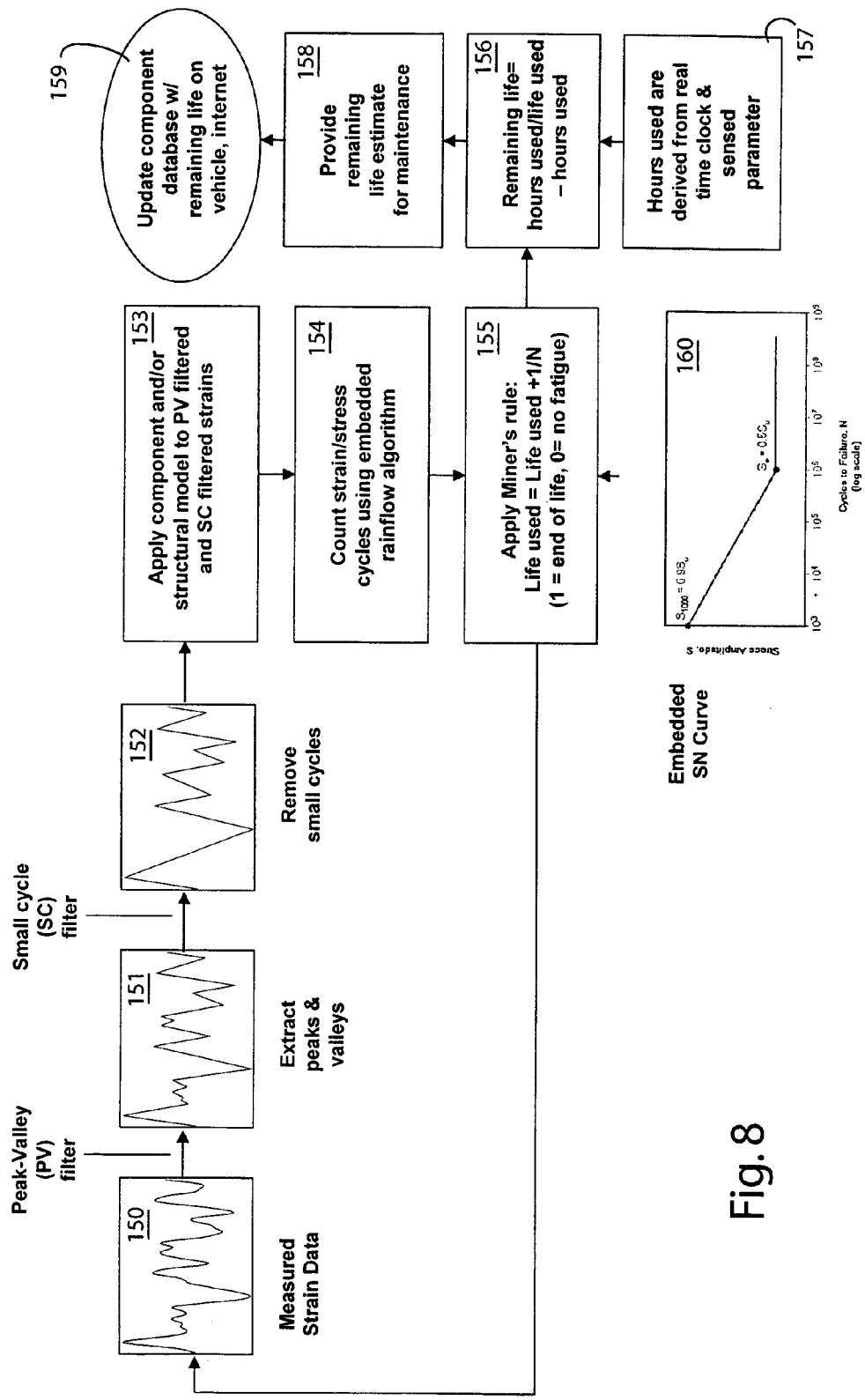
FIG. 8 is a flow chart for fatigue and remaining lifetime calculations.

Algorithms were also developed for peak valley compression and rain flow fatigue calculations, as shown in the flow chart in FIG. 8. Embedded within the memory of each energy harvesting wireless strain sensing node, the algorithms further reduce power consumption and enable the wireless nodes to track accumulated damage. Power consumption is reduced since performing calculations on board reduces the amount of wireless data communications which is a large power consumer. The measurement of accumulated damage can be used to optimize machine maintenance scheduling and to predict and prevent failures.

Strain data is acquired from sensors, as shown in box 150. A peak-valley filter is applied to this data to simplify the data into peaks and valleys, as shown in box 151. This reduces the amount of data that need be stored. Then a small cycle filter is applied, as shown in box 152, that removes the peaks and valleys that are below a programmable small excursion threshold. Then a component or structural model is applied to the filtered strain to adjust to accommodate strain concentrations or other geometrical considerations that might amplify or attenuate strain in another location on the structure or the component, as shown in box 153. Next the amplitude of each peak-valley strain cycles is determined using a rainflow algorithm, as shown in box 154. Minor's rule is applied, as shown in box 155 along with the embedded S/N curve in box 160 and the strain amplitude from box 154. Minor's rule provides that the current life used is equal to the previous life used +1/N wherein N is the estimated number of cycles that would produce a failure at a specified strain level. The number of cycles remaining before failure comes from the embedded S/N curve and the amplitude measured in rainflow algorithm box 154. The output of box 155 is the life used. Remaining life is then computed in box 156 from the hours the vehicle has been used divided by the life used as calculated in box 155 minus the hours used, where the hours used are derived from a real time clock and sensed parameter, as shown in box 157. The remaining life estimate from box 156 can then be provided on demand or wirelessly transmitted to maintenance personnel as shown in box 158 and a database updated for that component and for associated components, as shown in box 159.

For an application such as the pitch link, strain readings can easily be converted to loads through a prior calibration step applying static loads to the pitch link and measuring its strain response. A mathematical relationship between strains and loads can also be used.

Figure 5:
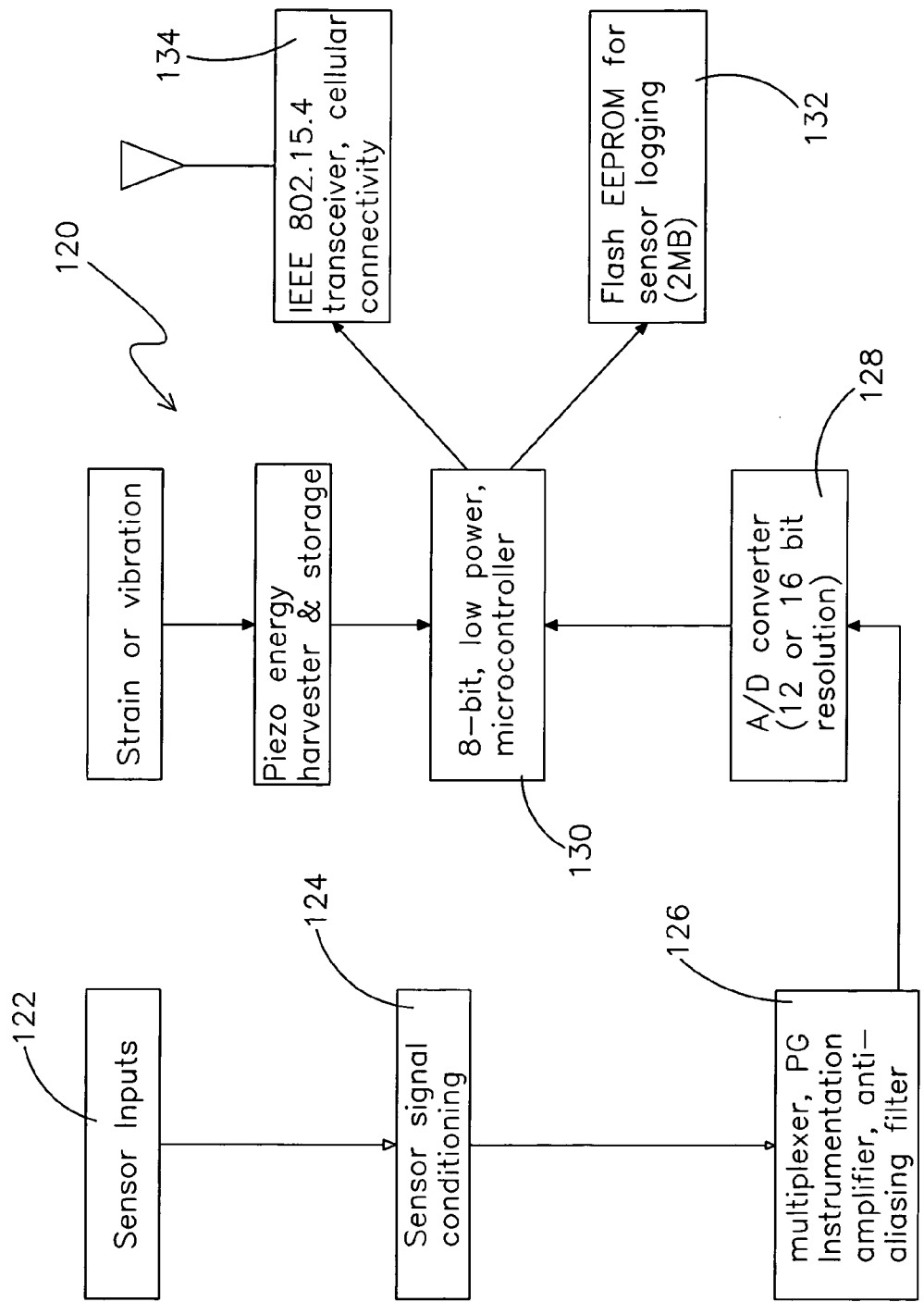
FIG. 5 is a block diagram of an energy harvesting sensing node subsystem.

Monitoring live service loads of pitch links is important for health usage structural monitoring because the pitch link is a key structural member connecting a helicopter's rotor blade pitch horn with the rotating swash plate. The present patent application provides instrumented pitch links that allow for improved characterization. As shown in FIG. 1 and FIGS. 5 and 6 the instrumented wireless energy harvesting pitch link of the present patent application integrates sensing, data acquisition, energy harvesting, energy storage, data logging, and wireless communications elements while eliminating battery maintenance and wiring for power or communications, allowing it to be located on such places as rotating components.

Energy Harvesting and Background Recharging for Wireless Sensing Modules

Vibration or strain energy may also be harvested using low cost piezoelectric (PZT) materials. A custom, tapered mechanical structure described in commonly assigned copending U.S. Provisional Patent Application No. 60/739, 976, "Slotted Beam Piezoelectric Composite," to David Churchill, incorporated herein by reference, efficiently converts low level vibrations to high strains, and serves as the carrier for the PZT material that converts the strains into electricity.

Figure 9:
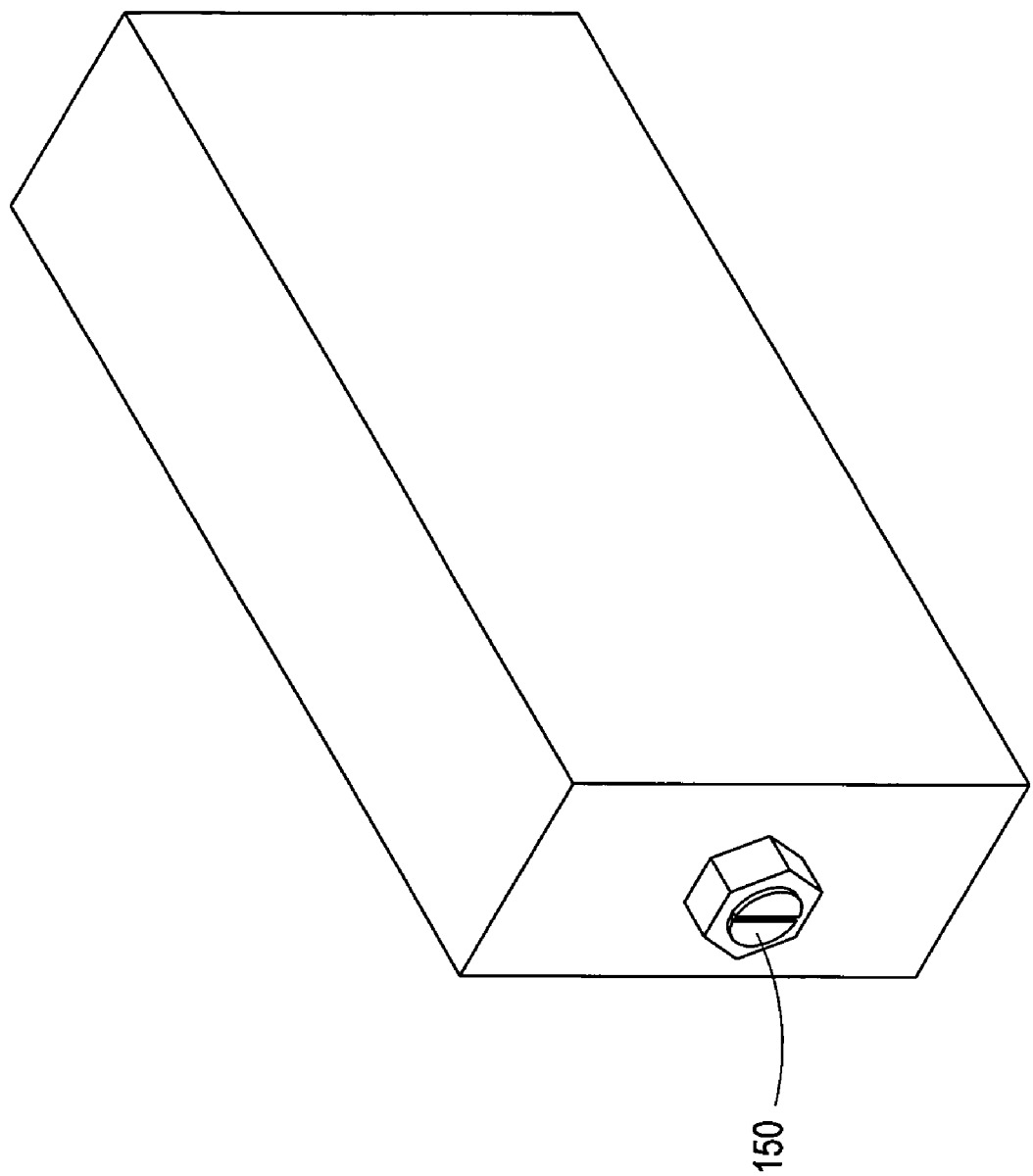
FIG. 9 is a three dimensional view of a field tunable vibration energy harvester for providing energy for a shipboard mounted wireless sensing network.

The harvester's resonant frequency can be tuned in the field using external adjustment 150 by moving location of the proof mass or by adjusting a magnetic field in proximity to a ferrous material or a permanent magnet located on the mass, as shown in FIG. 9 and as described in the '976 application. The PZT material was epoxy bonded to the tapered flexure element, which provided a uniform strain field to the PZT material as described and illustrated in the '976 application. During tests of this element, a strain gauge was bonded to the PZT material to facilitate documentation of the strain levels that were present within the PZT. Adjustment of the (240 gram) proof mass location relative to the fixed end of the flexure allowed us to mechanically "tune" the harvester's resonant frequency. Resonance could be readily adjusted from about 38 Hz to about 55 Hz.

The weight of the vibrating energy harvesting wireless sensor is significantly lower than the weight of a conventional hardwired installation of similar capability. It is also low enough so as not to significantly influence the resonant frequency of the underlying structure to which it is mounted. While the allowable mass depends on the specific structure to which it is attached the present applicants found that components weighing less than several ounces meet these criteria. Since the proof mass is the single largest contributor to system weight, they found that providing a proof mass of 2 ounces or less allows for a target weight for a complete vibrating energy harvesting wireless sensor of 3-4 ounces.

Harvester Design: Analytical modeling performed by the present applicants has shown that, for a given input vibration frequency, w, and displacement amplitude of vibration, A, the electrical power, U, that can be generated by a vibrational energy harvester is estimated by $$U = \frac{m \cdot \zeta e \cdot A^2 \cdot \left(\frac{\omega n}{\omega}\right) \cdot \omega^3}{\left[\left(\frac{\omega n}{\omega}\right)^2 - 1\right]^2 + \left[2 \cdot (\zeta m + \zeta e) \cdot \frac{\omega n}{\omega}\right]^2}$$

where m is the proof mass, $\zeta e$ is the electrical damping, $\zeta m$ is the mechanical damping, and $\omega n$ is the natural frequency of the harvester's resonant structure. Thus, the power output is proportional to the magnitude of the proof mass and to the square of the vibration amplitude.

For helicopter applications, small energy harvesters can be used since the vibration levels tend to be high aboard helicopters. A vibration harvester can be used for providing power for applications such as monitoring the vibration conditions of gearboxes and recording thermal histories of engine compartments and electronic bays.

In the case of the pitch link of a helicopter, the present applicants have demonstrated that background battery recharging can be accomplished using the direct strain energy harvested from the straining pitch link itself, eliminating the need for a resonant beam element. Thus, wireless energy harvesting load sensing of helicopter pitch links can rely on pitch link strain energy harvesting. The wireless sensing subsystem used on the pitch link is scalable to allow support of a wide range of sensing and energy harvesting applications.

Charge generated by the strained piezoelectric material was stored on an input capacitor. Once sufficient charge had accumulated on the input capacitor, and the voltage on this capacitor reached a prescribed level, then the output of this capacitor was fed to the input of a high efficiency step down converter. The converter steps the high voltage on the input capacitor to a lower voltage on the output capacitor (or battery) to provide power to drive the wireless sensing node, as described in the '693 patent and in the '642 application. In order to provide for long term energy storage, a stack (of five), thin film electrochemical batteries (Infinite Power Solutions, Golden, Colo.) were used in place of the output capacitor. These batteries are advantageous because they exhibit extremely low leakage, they are very thin, and they do not suffer from reduced capacity with repeated charge & discharge cycles.

Figure 10:
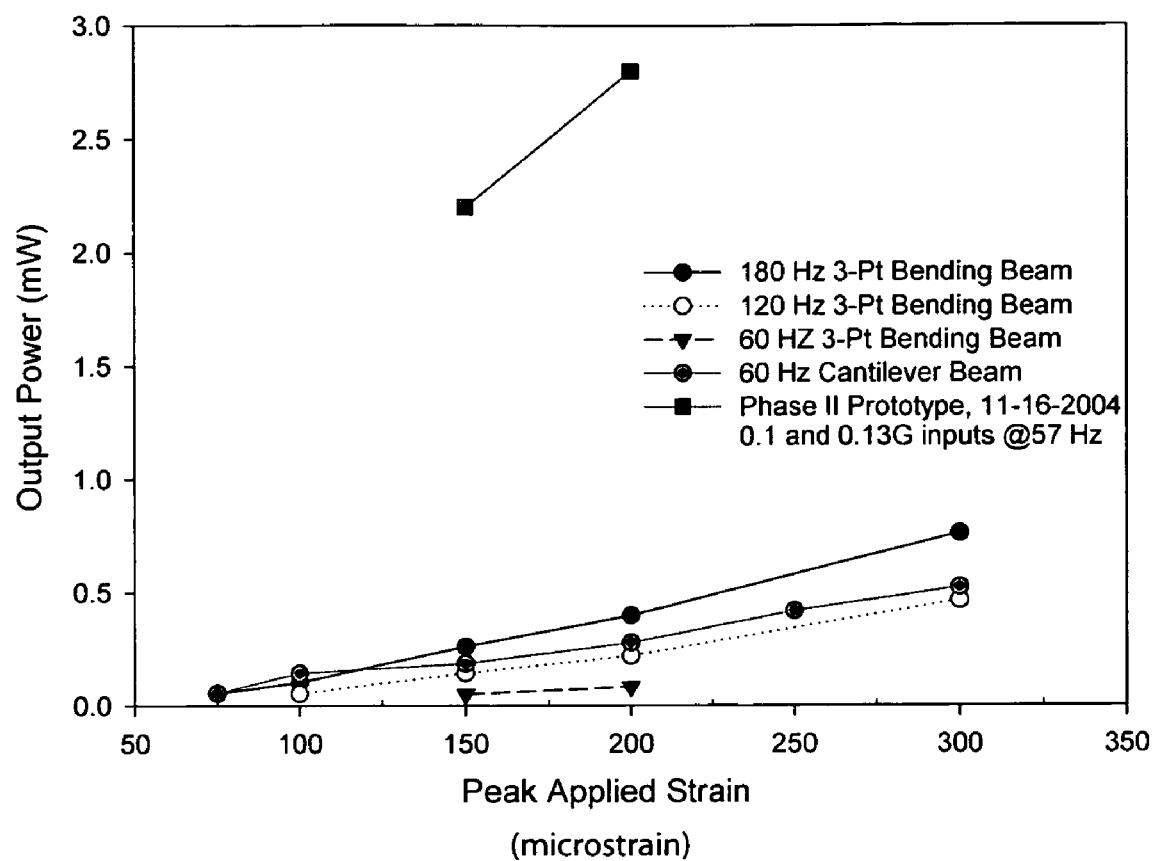
FIG. 10 is a graph providing data showing the output power of a resonant flexure piezoelectric energy harvesting device in comparison with non-resonant energy harvesting systems.

The electrochemical battery stack was background charged when sufficient charge had been accumulated on the input capacitor[8]. In a laboratory test of vibration energy harvesting simulating low level vibrations that might be found on a ship or aircraft, the PZT harvester produced from 2.2 to 2.8 milliwatts of output power at input vibration levels of only 0.1 to 0.13 G's and at relatively low strain levels (150 to 200 microstrain). At these low vibration levels the vibrations were barely perceptible to human touch. FIG. 10 plots strain input vs. power output for both resonant flexure and non-resonant harvester types. Our wireless relative humidity and temperature demonstration node, programmed for a one second wireless update rate, may be powered perpetually with about 100 milliG's of input vibration energy.

[8] Arms, S. W., Townsend, C. P., Hamel, M. J., Churchill, D. L., "Vibration Energy Harvesting for Wireless Health Monitoring Sensors", Proceedings Structural Health Monitoring 2005, pages 1437-1442, Stanford, Calif., September 2005

A charge controller circuit was demonstrated that periodically checks the state of the battery and, if appropriate, disconnects the load from the battery, thereby protecting the battery from damage which can be sustained if the battery voltage drops below a prescribed voltage (2.0 volts). This was accomplished by using a micropower comparator and a low "on" resistance switch. The quiescent current of this switch was less then 350 nanoamperes on average.

Inertial Sensing Suite Integrated with GPS

In one embodiment, a micro-electromechanical system (MEMS) inertial and magnetic sensing suite, called 3DM-GX1™, is combined with a Global Positioning System (GPS) unit & antenna as shown in FIGS. 3, 4, and 8. 3DM-GX1 combines three angular rate sensors with three orthogonal DC accelerometers, three orthogonal magnetometers, a multiplexer, a 16 bit A/D converter, and an embedded microcontroller, to output its orientation in dynamic and static environments. Operating over the full 360 degrees of angular motion on all three axes, 3DM-GX1 provides orientation in matrix, quaternion and Euler formats. The digital serial output can also provide temperature compensated, calibrated data from all nine orthogonal sensors at update rates of 350 Hz. Output modes and software filter parameters are user programmable. Programmed parameters and calibration data are stored in nonvolatile memory. Further description is provided in the '384 and '637 applications.

Inertial & Magnetic MEMS Sensing Suite

Figure 11:
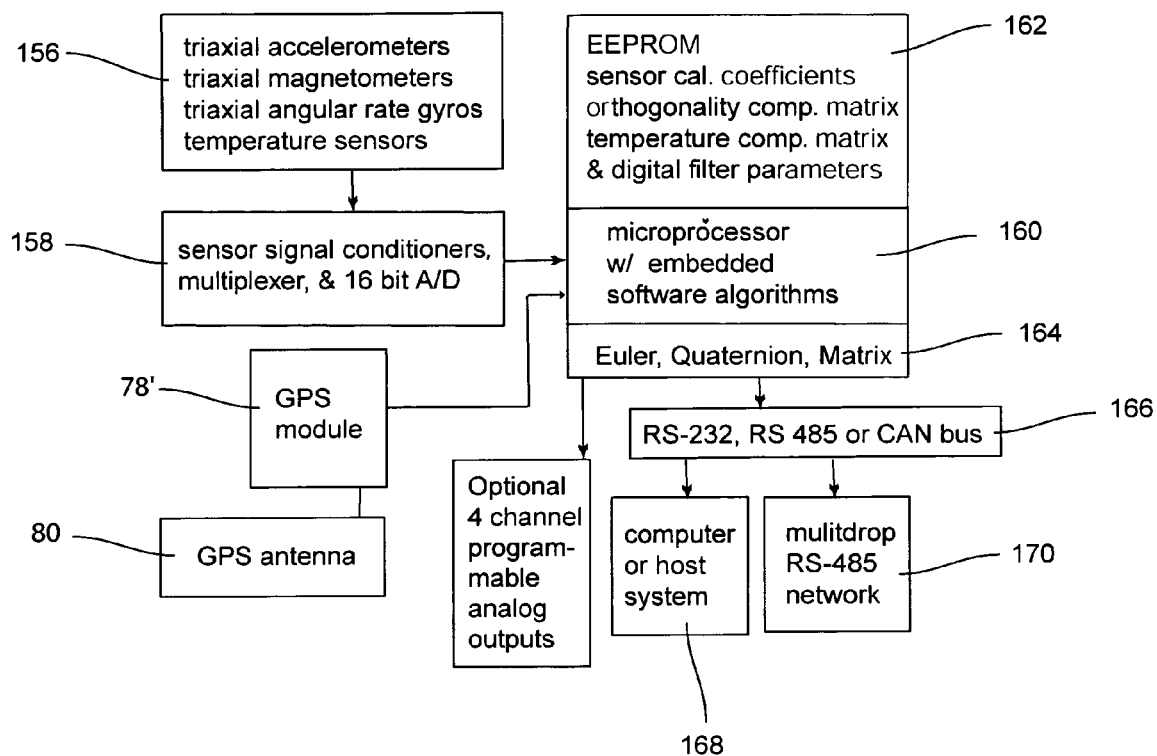
FIG. 11 is a block diagram of an inertial sensing system with triaxial accelerometers, magnetometers, angular rate sensors and a GPS system.

3DM-GX1 includes sensors 156 connected to signal conditioners and multiplexer 158 for feeding data to microprocessor 160 which can run embedded software algorithms, as shown in FIG. 11 to compute orientation in Euler, matrix, and quaternion formats on board. Microprocessor 160 is able to store data on associated EEPROM 162. Also stored there are sensor calibration coefficients, orthogonality compensation coefficients, temperature compensation coefficients, and digital filter parameters. The microprocessor can calculate Euler angles, quaternion and matrix as shown in box 164 and can provide output through RS 232, RS 485, or CAN bus 166 to computer or host system 168 or to multidrop RS 485 network 170. It can also provide 4 channel programmable analog outputs.

3DM-GX1 uses its triaxial gyros to track dynamic orientation. It uses the triaxial DC accelerometers along with the triaxial magnetometers to track static orientation. The embedded microprocessor contains a unique programmable filter algorithm, which blends these static and dynamic responses in real-time. The algorithm provides a fast response in the face of vibration and quick movements, while eliminating drift. The stabilized output is provided in an easy to use digital format. Analog output voltages proportional to the Euler angles can also be provided. Full temperature compensation is provided for all nine orthogonal sensors to insure performance over a wide operating temperature range. A block diagram of the inertial sensing subsystem (ISS) is provided in FIG. 11.

3DM-GX1 Detailed Specifications

| | Parameter | Specification | Comments |
|---|---|---|---|
| Attitude | Range: Pitch, Roll, Yaw (°) | 360, all axes | Matrix & Quaternion Modes |
| | | +/−90, +/−180, +/−180 | Euler Angles Mode |
| | Static Accuracy (°) | +/−0.5 | |
| | Dynamic Accuracy (° rms) | +/−2.0 | Typical, application dependent |
| | Repeatability (°) | +/−0.2 | |
| | Resolution (°) | 0.1 | |
| General Performance | A/D converter resolution (bits) | 16 | |
| | Turn on time (sec) | 0.8 | |
| | Analog output (Optional) | 0-5 V | 4 channels, user configurable |
| | Update Rate (Hz maximum) | 100 | Orientation outputs |
| Physical | Size (mm) | 65 × 90 × 25 | With enclosure |
| | | 42 × 40 × 15 | Without enclosure |
| | Weight (grams) | 75 | With enclosure |
| | | 30 | Without enclosure |
| Electrical | Supply Voltage (V) | 5.2 to 12 DC | |
| | Supply Current (mA) | 65 | |
| Environmental | Operating temperature (° C.) | −40° C. to +70 | With enclosure |
| | | −40° C. to +85 | Without enclosure |
| | Vibration (g rms) | 4 | 20-700 Hz, white |
| | Operational Shock (g) | 20 | 10 msec halfsine |
| | Survival Shock (g) | 500 | |
| Communications | Serial Interface | RS-232, RS-485 | RS-485 networking optional |
| | Serial Communications speed (kBaud) | 19.2, 38.4, 115.2 | User selectable |
| Angular Rate | Range (°/sec) | +/−300 | Custom ranges available |
| | Bias | | |
| | Turn-on to turn-on repeatability (°/sec) | TBD | 25° C. fixed temperature |
| | In-Run stability, fixed temp. (°/sec) | 0.1 | After 15 minute warm up |
| | In-Run stability, over temp. (°/sec) | 0.7 | Over −40° C. to +70° C. range |
| | Short term stability (°/sec) | 0.02 | 15 second Allan variance floor |
| | Angle random walk, noise (°/√hour) | 3.5 | Allan variance method |

-continued

| | Parameter | Specification | Comments |
|---|---|---|---|
| | Scale Factor Error (%) | 0.5 | Over −40° C. to +70° C. range |
| | Nonlinearity (% FS) | 0.2 | |
| | Resolution (°/sec) | 0.01 | |
| | G-sensitivity (°/sec/g) | 0.01 | Std w/ g-sensitivity compensation |
| | Alignment (°) | 0.2 | Std w/ alignment compensation |
| | Bandwidth (Hz) | 30 | −3 dB Nominal |
| Acceleration | Range (g) | +/−5 | Custom ranges available |
| | Bias | | |
| | Turn-on to turn-on repeatability (mg) | TBD | 25° C. fixed temperature |
| | In-Run stability, over temp. (mg) | 10 | Over −40° C. to +70° C. range |
| | Short term stability (mg) | 0.2 | 15 second Allan variance floor |
| | Noise (mg/√Hz rms) | 0.4 | |
| | Scale Factor Error (%) | 0.5 | Over −40° C. to +70° C. range |
| | Nonlinearity (% FS) | 0.2 | |
| | Resolution (mg) | 0.2 | |
| | Alignment (°) | 0.2 | Std w/ alignment compensation |
| | Bandwidth (Hz) | 50 | −3 dB Nominal |
| Magnetic Field | Range (Gauss) | +/−1.2 | |
| | Bias | | |
| | Turn-on to Turn-on repeatability (mGauss) | TBD | |
| | In-Run stability, over temp. (mGauss) | 15 | Over −40° C. to +70° C. range |
| | Noise (mGauss/√Hz) | TBD | |
| | Scale Factor (%) | 0.7% | |
| | Nonlinearity (% FS) | 0.4 | |
| | Resolution (mGauss) | 0.2 | |
| | Alignment (°) | 0.2 | Std w/ alignment compensation |
| | Bandwidth (Hz) | 50 | Nominal |

GPS Enhancement

Commercially available GPS units and antennas are available from a wide variety of sources. GPS antenna with external mount for external mount on an aircraft are environmentally sealed and are available from Navtech, Model 12700 Antenna.

GPS data is used to compensate for inertial errors that can occur during sustained aircraft turns. GPS input is relatively low cost to implement (from a parts perspective), and provides benefits, including very precise velocity data, ground speed, altitude, latitude, longitude, and timing information[9]. The velocity data is used to correct 3DM-GX1 orientation errors due to centrifugal forces.

[9] El-Sheimy, N: Report on Kinematic and Integrated Positioning Systems, FIG XXII International Congress, Washington, D.C. USA, Apr. 19-26 2002 (htt)://www.fig.net/nub/fig_2002/TS5-1/TS5_1_elsheimv.pdf)

Figure 12:
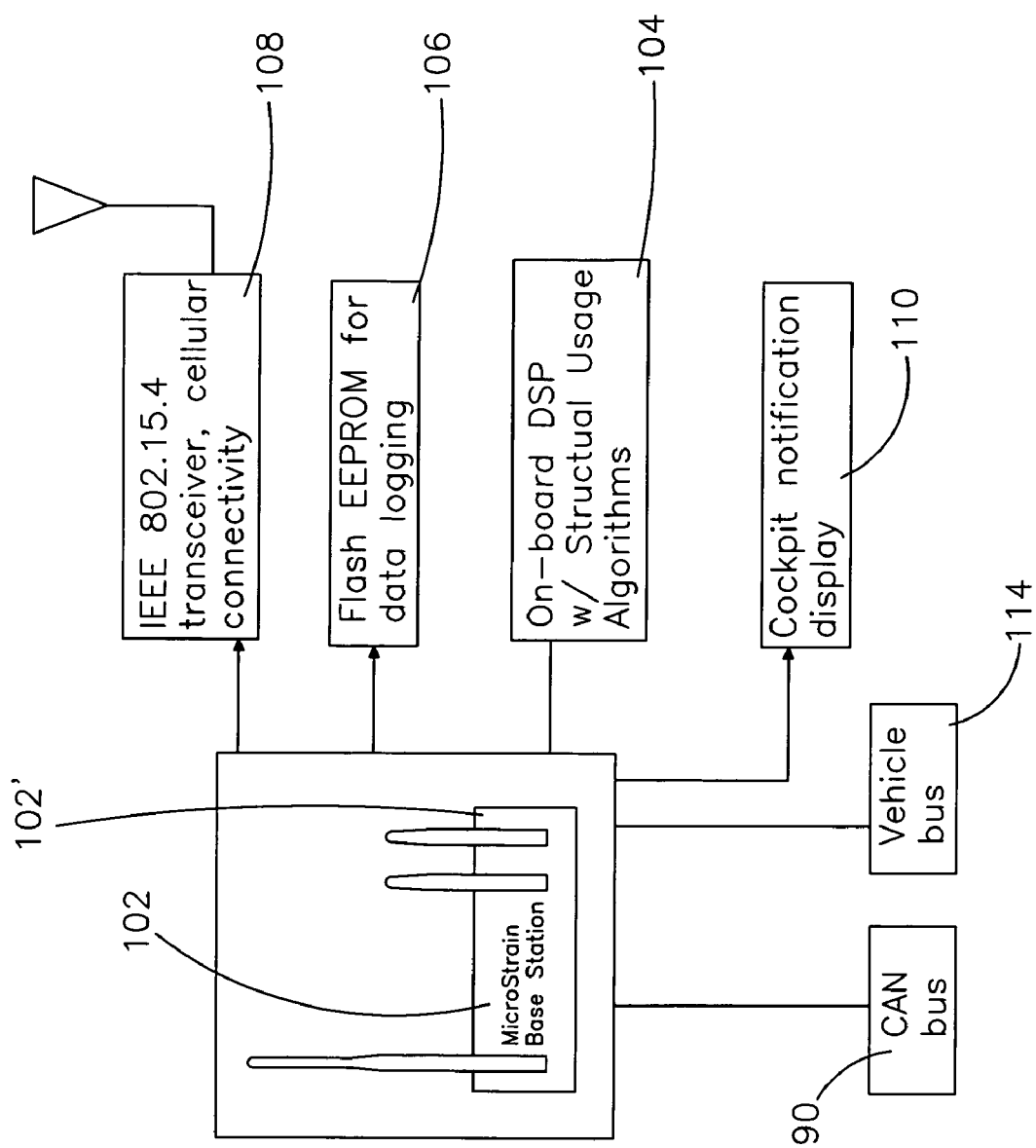
FIG. 12 is a block diagram of a structural monitoring system gateway for integrating data from a CAN bus and from an 802.15.4 wireless network.

Base station 102 for the structural health monitoring system supports data recording and remote access from both wireless and hard-wired networked sensors, as shown in FIGS. 4 and 12. Base station 102 serves as the data aggregation engine for the system, acquiring data from hardwired, high speed networked sensors, such as the inertial sensing subsystem (ISS) as well as data from the wireless sensing network (Wireless sensing node), such as the energy harvesting, load sensing pitch link. FIG. 12 provides a representative enclosure 102' for base station 102, along with those components integrated within that enclosure, including IEEE 802.15.4 transceiver and cellular connectivity 108, flash EEPROM 106 for data logging, on board DSP 104 with structural usage algorithms, cockpit notification display 110, can bus 90 and vehicle bus 114. Base station 102 can be located on the helicopter or it can be located on a ground vehicle that communicates with the helicopter or it could be in a hand held device where it could be used to query the wireless network.

Microprocessor engine DSP 104 can be a low power PC 104 compatible single board computer based on the Intel® IXP425 XScale® network processor, as shown in FIG. 12. The IXP425 is an implementation of the ARM compliant, Intel XScale microarchitecture combined with communication peripherals including, 2 high speed Ethernet MACs, hardware accelerated cryptography, 2 high speed serial ports, a local PCI interface and DMA controller. Table III provides a set of specifications for the gateway.

TABLE III

Gateway Specifications

| Parameter | Typical | Units |
|---|---|---|
| Operating temperature range | −55 to +85 | Degrees C. |
| On board temperature measurement range | −55 to 85 | Degrees C. |
| Humidity range | 0 . . . 100 | % RH |
| Microprocessor Engine | PC104 IXP425 Xscale SBC | n/a |
| Data security encryption | DES, 3DES, AES, with tamper detection inputs | n/a |
| Internal Non-Volatile Storage | Compact Flash interface (8 Gb max) | n/a |
| Hardwired Bus Interface | CAN Bus 2.0 | n/a |
| Alternate Hardwired Network Interface | Ethernet (TCP/IP)/ USB/Serial Ethernet port supports hardware accelerated cyptography | n/a |
| Wireless Sensor RF Data Interface | IEEE802.15.4 | n/a |
| RF Transmission Frequency | 2.450-2.490 | GHz |
| RF channels | 16 | n/a |
| RF Transmission range | 70 | Meters (line of sight) |
| RF Output power | 0 | dBm |
| RF Modulation Type | Direct Sequence Spread Spectrum | n/a |
| Power (Full operating mode) | 3.5 | Watt |
| Power (Sleep Mode) | <5 | mW |
| Dimensions | PC/104 from factor 3.8" × 3.6" | |

Timing & Communications Protocols

Two communication interfaces allow transmission of real time sensor data or downloading of previously recorded data. The first communications interface is hardwired controller area network (CAN) bus 90. This CAN bus may support the inertial sensing suite (ISS) interface to base station 102. Alternatively a low power wireless interface can be used to support the many applications where it is difficult to impossible to embed lead wires for data communication from the system under test. A low power IEEE802.15.4 bidirectional direct sequence spread spectrum radio link 108 and an embedded protocol stack that can support ad hoc multi-hop communications may be used in each of the wireless sensing nodes for these applications.

CAN Bus Hard-Wired Network

The wired bus network uses automotive grade, commercial off the shelf (COTS) CAN transceivers to provide a multidrop distributed communication bus that allows up two 32 individual inertial sensing nodes to be located on the network. The CAN bus is a broadcast type of bus. This means that all nodes can "hear" all transmissions. There is no way to send a message to just a specific node; all nodes will invariably pick up all traffic.

The CAN hardware, however, provides local hardware filtering so that each node may react only to messages intended for the particular node. The network uses a 2 wire communication topology with a maximum data rate of 1.0 Mbps. The CAN bus may be converted into the aircraft standard 1553 network protocol in the future. Note that when the wired bus is used for the hardware communications architecture, then power for these sensing nodes would also be provided on the network, which eliminates the need for energy harvesting on these nodes. The CAN network can also support future nodes, which may include both sensing and actuation capabilities. Actuators can be used in concert with piezoelectric materials for active damping and/or for providing signal for non-destructive material testing (such as acoustic crack detection), as described in commonly assigned copending U.S. patent application Ser. No. 11/368,731, "Miniature Stimulating and Sensing System," ("the '731 application") to John Robb et al, filed Mar. 6, 2006, incorporated herein by reference. Actuators may also be used for damping vibration.

IEEE802.15.4 Wireless Network

The IEEE802.15.4 network is a standard for low power data communication networks. These radio systems use extremely low power relative to radio networks such as Bluetooth (IEEE802.15.1) and WiFi (IEEE802.11), and such are very suitable for use in distributed sensor network applications. The 802.15.4 radios use low power (1 mW) direct sequence spread spectrum (DSSS) radios at 2.4 GHz for the physical communication layer. The radio standard also incorporates AES128 data encryption standard for its security layer, which allows for secure transfer of over the air data. The over the air data transfer rate is 250 kbps which is adequate for transfer of stored data in this application.

Figure 13:
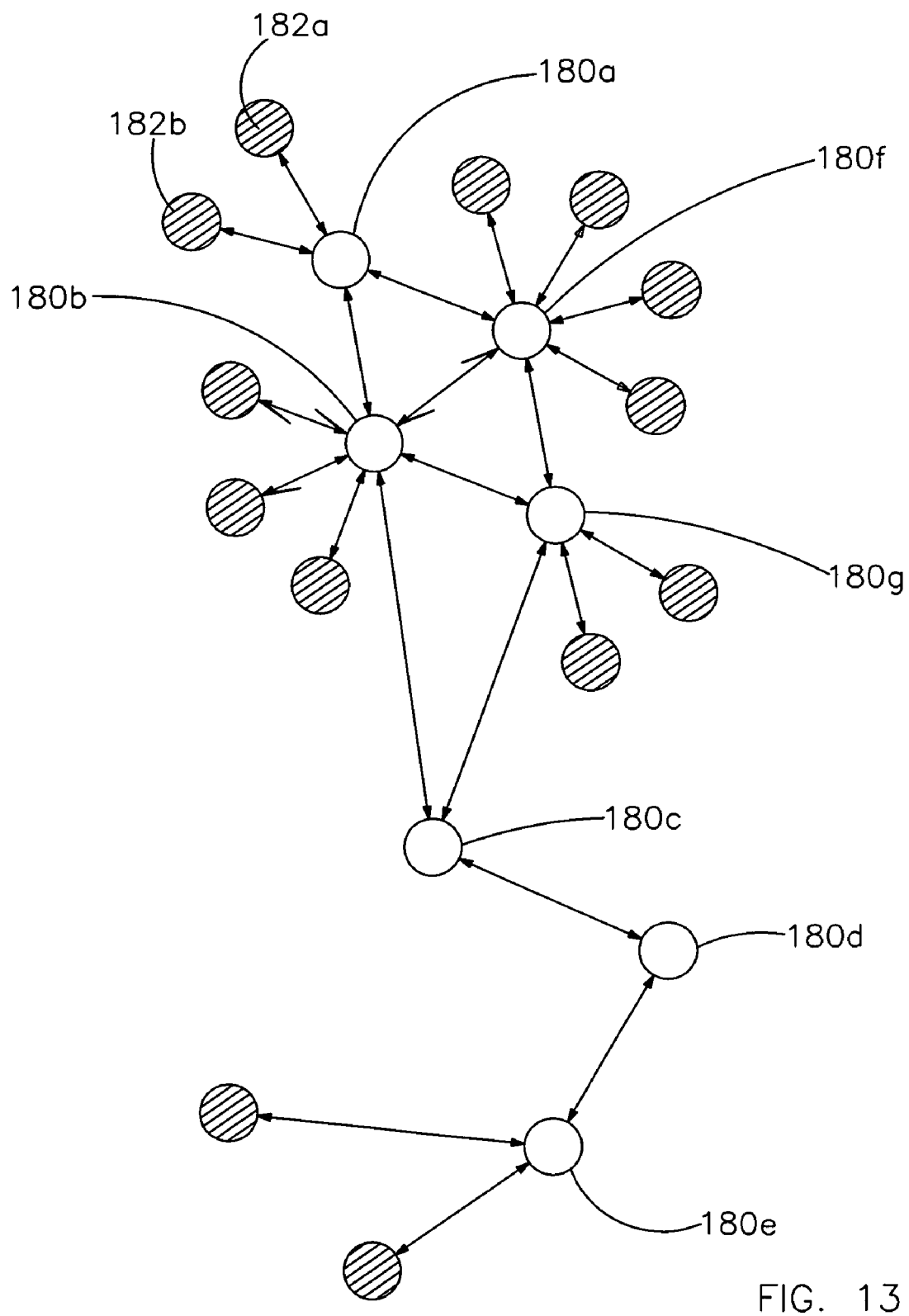
FIG. 13 illustrates a star-mesh hybrid network topology.

The 802.15.4 standard does not specify the network topology to be used. However, since the radios are very low power, mesh network topologies, as shown in FIG. 13, are often implemented using this technology. A mesh network allows for any node in the network to transmit to any other node in the network within its radio transmission range. This allows for what is known as multihop communications, that is, if node 180*a* wants to send a message to another node 180*e* that is out of radio communications range, it can use an intermediate nodes 180*b*, 180*c*, and 180*d* to forward the message to the desired node 180*e*. This network topology has the advantage of redundancy and scalability. If an individual node fails, such as 180*b*, a remote node such as 180*a* can still communicate to any other node in its range, which in turn, can forward the message to the desired location by routing, for example, through nodes 180*f* and 180*g*. In addition the range of the network is not necessarily limited by the range in between single nodes, it can simply be extended by adding more nodes to the system. This multihop capability can be used in embedded instrumentation applications, where radio range can be degraded due to fading losses and multipath interference when radios are embedded in equipment.

Alternatively, when higher packet rates are desired, a star network topology is more desirable, as shown in FIG. 13. The wireless nodes of the present patent application will support both a star and mesh network topology. FIG. 13 shows a combination of star and mesh topology. Single hop node 182*a* and 182*b* communicate only to multihop node 180*a* for example. The specific use will determine which topology is most appropriate.

A single chip IEEE802.15.4 CMOS radio can be used for data communications and a third party multihop radio stack can be used to implement the data communication protocol (MicroChip, Chandler, Ariz.).

Data logging transceivers with sensors for measuring different parameters, such as acceleration, strain, and voltage, are available from Microstrain, Inc., Williston, Vt. These devices employ addressable sensing nodes with data logging capabilities, embedded processing and control, a bi-directional, direct sequence spread spectrum (DSSS) radio frequency (RF) transceiver communication link, and rechargeable Li-Ion batteries. For example, MicroStrain's commercially available SG-LINK single and multi-channel wireless strain sensing nodes (http://www.microstrain.com/sg-link_specs.aspx) include features designed to facilitate use with quarter, half, and full bridge foil strain gauges as well as full bridge Wheatstone bridge transducers (pressure sensors, accelerometers, load cells, torque cells), as well as strain rosettes. A full bridge strain gauge implementation can be used on the pitch link to provide an output proportional to pitch link axial loads while compensating for thermal expansion and contraction.

The SG-Link features include on-board precision bridge completion resistors, wireless shunt calibration capability, wirelessly software programmable offset and gain adjust, wirelessly programmable sampling rates (currently from 1 to 2000 Hz), and multiplexed & pulsed strain gauge bridge excitation (to enhance battery life). The thermal stability of these systems (from 0 to 50 degrees C.) is 0.007%/deg C. (offset) and 0.004%/deg C. (gain). Strain measurement range is typically +/−2500 microstrain full scale, with strain measurement resolution of +/−2.5 microstrain (2 pole low pass filter 3 dB down at 500 Hz)[10]. These capabilities also exist on wireless sensing nodes of the present patent application.

[10] Arms et al., Wireless Strain Sensing Networks, 2nd European Workshop on Structural Health Monitoring, Munich, Germany, 7-9 Jul. 2004

A central host orchestrates sample triggering and high speed logging to each node or to all nodes of a network of these wireless transceivers. Data may be processed locally (such as frequency analysis) then uploaded when polled from the central host. By providing each sensor node with a 16 bit address, as many as 65,000 multi-channel nodes may be hosted by a single computer. Since each node only transmits data when specifically requested, the power usage can be carefully managed by the central host. One embodiment of the base station included cellular telephone capability for transmitting data and for remote programming and data management of a strain sensing network. Embodiments of the present patent application add such functions as GPS, energy harvesting, precision time keeping, high speed data logging, and features for low power operation.

System Time Synchronization

With multiple physical interfaces for communications employed in the same network, time synchronization is maintained between all nodes on the network. Maintaining time synchronization between the gateway and the CAN inertial nodes is relatively simple, as the busses are wired together and synchronization can be easily maintained using the wired bus. However, the wireless network nodes are more difficult to keep synchronized because they are very low power devices that cannot afford the energy to constantly listen for a synchronization packet. Therefore, it is desirable to only periodically send a timing packet to the wireless node for synchronization. For this to be effective, a highly stable local time reference is provided at each wireless node. The present applicants found that a stable real time clock with temperature compensation for the clock achieves a timing stability of approximately 2 parts per million (ppm). A 2 ppm error would result in a timing error accumulation of 2 microseconds per second. The present applicants found for a star network that the desired network timing synchronization of 1 millisecond can be achieved by broadcasting a synchronization byte with a time synchronization update just once every 500 seconds.

The structural monitoring system (SMS) of the present patent application breaks down significant barriers to structural monitoring. The scalable wireless network eliminates costly wire runs to strain gauges & other sensors. Energy harvesting eliminates the need for battery maintenance. Support for the high speed networked CAN bus standard supports power & data acquisition for inertial sensors, with less wire (since the CAN bus supports a multi-drop network). GPS support provides important vehicle velocity & position data, and enhances the accuracy of the inertial sensing system (ISS).

The system architecture of the present patent application allows for flight tests to be performed with a range of wireless and networked sensing nodes. The wireless nodes may be deployed to monitor the loads on the rotating components of helicopters, for example, but they may also be used for fatigue monitoring on fixed wing aircraft. Unmanned vehicles could also benefit from the capability to autonomously track and assess structural damage "on the fly".

Time stamped load data from key structural elements (collected by the wireless sensing nodes), combined with pitch, roll, and yaw information (collected by the ISS/GPS) is gathered by the on-vehicle Gateway. This allows time slices to be made through all the data, based on peaks in the inertial data. This time sliced information can be used for flight regime recognition.

This regime recognition may be performed on the Gateway itself so that the vehicle becomes "self-aware" and can assess and record severity of usage, and usage history. This information can be used for enhanced condition based maintenance, by providing important information on the fatigue rates of the vehicle's structure and rotating components. Combined with component tagging & tracking, operators and maintenance and repair organizations can use the SMS to automatically update the status of the life-limited parts according to FAR 121.380 (a)[11]. The information can also be used in health usage monitoring systems (HUMS).

[11] El-Bakry, M., Component Tagging & Tracking—An Essential Enabling Technology for Effective 'Safe Life' Structural Monitoring, Proceedings of 5th Intl. Workshop on Structural Health Monitoring, Stanford, Calif., Sep. 12-14, 2005

A very high speed, microelectronics module, called NANO-DAQ which supports both fast data acquisition and complex sensor excitation for embedded test & evaluation systems is described in the '731 application. NANO-DAQ's high speed data acquisition package has achieved a very small form factor and is expected to find uses in a wide range of applications, including: impact testing, modal analysis, acoustic waveform analysis, and materials testing. It can be used in sensor nodes of the present patent application.

NANO-DAQ is capable of sampling millivolt level differential sensor signals (such as from a Wheatstone bridge type accelerometer) at very high speeds (1 Mega sample per second, maximum) for a short time period (1 millisecond maximum). The sample rate and sampling duration are software programmable, by the end user, over the USB port. Non-volatile, embedded flash memory stores up to 1000 data points with 16 bit resolution. In addition to data acquisition, the embedded microprocessor and on-board digital to analog converter (DAC) were combined to create an arbitrary waveform generator (AWG) which provides high voltage (+20 V) sensor excitation waveforms. Thus, in addition to sensing, the nodes of the present patent application can be used to provide acoustic and electrical signals for materials testing.

Piezoelectric Energy Harvesting Strain Measurement System

Figure 14:
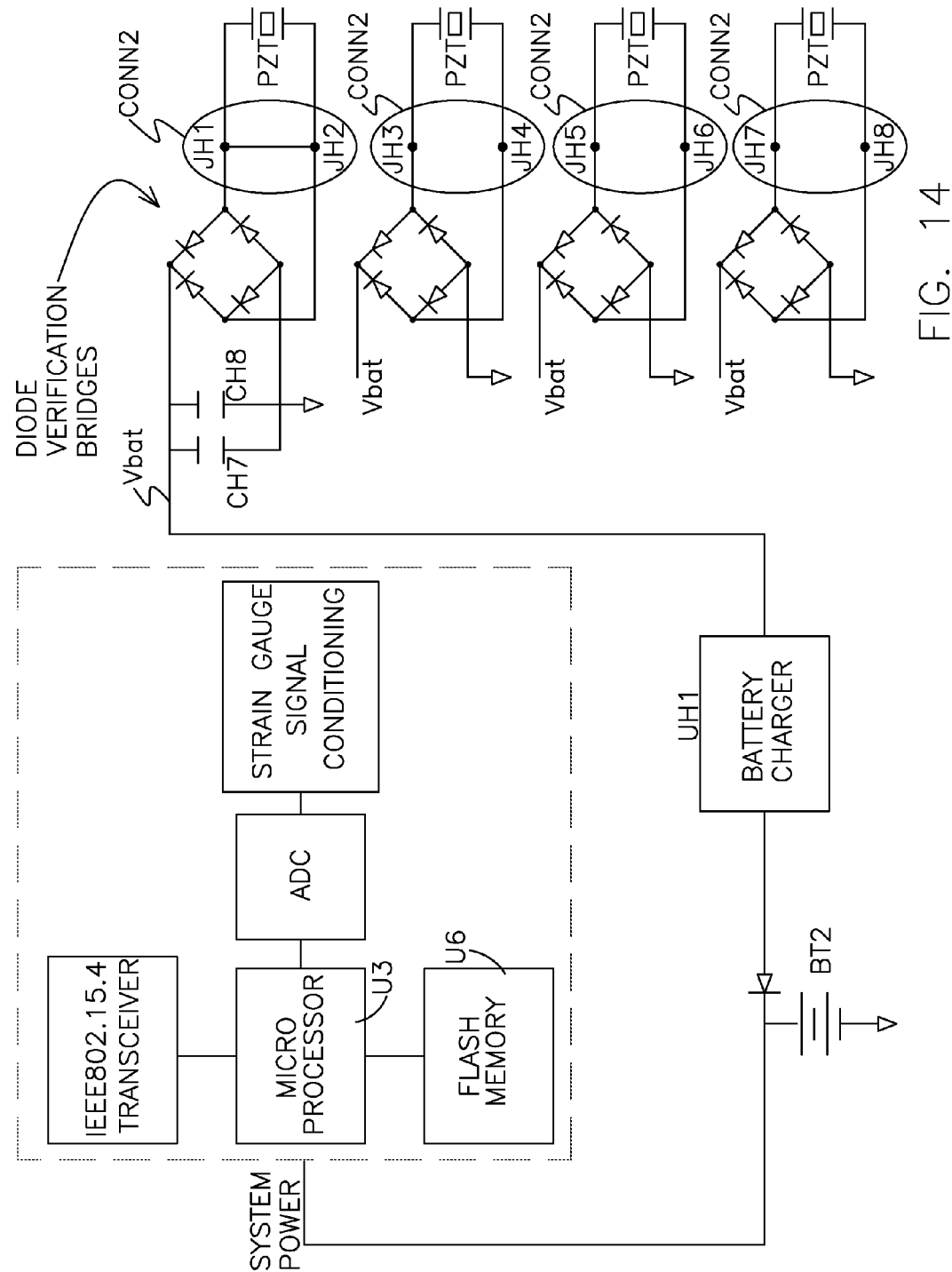
FIG. 14 is a schematic diagram of one embodiment of the system of the present patent application.

A schematic diagram of the system is shown in FIG. 14. One or more piezoelectric material is connected to Conn2. When piezoelectric material is subjected to dynamic (changing) strain, an AC voltage is generated at connectors JH1 and JH2. This AC voltage is rectified and filtered by full wave diode rectification bridges. Charge provided by this voltage is stored in capacitors ch7 and ch8. The voltage (Vbat) on the capacitors is then regulated and supplied as system power to the rest of the circuit. Alternatively, if more power is available then required by the circuit, the extra charge can be stored in battery BT2 by switching on the battery charging regulator, UH1. Once the voltage on Vbat is reduced to a value that is lower then that required to charge the battery the regulator is turned off by the microprocessor. The microcontroller U3 controls the basic operation of the application circuit. Periodically, the microcontroller wakes up and samples data from the strain gauges and transmits or logs the sampled data to flash memory, U6.

Health Monitoring of the Strain Gauge Using Built in Test (BIT)

The magnitude of the voltage produced by the piezoelectric patch increases as the amplitude of the dynamic strain level increases (referred to as the PZT peak to peak amplitude, or Apzt. This signal can be used as a reference to compare to the dynamic component (referred to as the strain gauge peak to peak amplitude, or Asg) of the strains measured by foil strain gauges. One way to track the health of the strain gauges is to form a ratio of these two amplitudes:

Ratio=$Asg/Apzt$

This ratio may be recorded by the on board processor and recorded locally (or logged on an on-board machine) during typical operating conditions, such as straight and level flight. The ratio will tend to remain the same during operation if the health of the PZT and strain gauge elements does not change. In the case of the strain gauge output degrading because of delamination (or debonding of the strain gauge from the component substrate), the ratio would tend to decrease. In the case of the PZT elements debonding from the component substrate, or should some of the PZT fibers start to fail, this ratio would increase.

One could also use the difference (rather than the ratio mentioned above) between the strain amplitudes as measured by the piezoelectric and by the foil gauges as a built in self test (BIST). Ideally, a dynamic calibration procedure would be used to allow the PZT amplitude to be expressed in units of microstrain. This would require a calibration procedure, which could be done at the factory prior to delivery to the customer, in order to document the sensitivity of the PZT to applied dynamic strains.

The instrumented component could be calibrated for static and dynamic load measurement. Known loads would be applied through a dynamic actuator (such as a hydraulic ram) through a "gold standard" such as a pre-calibrated load cell. The loads as reported by the load cell would be monitored simultaneously with outputs of amplitude from the PZT elements as well as the strain gauges. This information would be stored in order to facilitate conversion of digital output from the electronics that condition the PZT and strain gauges into separately measured loads (dynamic for the PZT, and both static and dynamic for the strain gauges). A static load calibration can be used to derive load both static and dynamic information from the output of the strain gauges, while the PZT cannot be calibrated statically.

One method of calibrating the PZT output would be to use the dynamic strain gauge output as the "gold standard" for strain measurement to calibrate the PZT. This has the advantage of eliminating the need for a dynamic load calibration. It may be advantageous to perform this calibration method early in the installation process, when the strain gauges and the PZT have not been subjected to potential degradation from exposure to the environment and from cyclic strain.

Piezoelectric materials can be used as strain gauges when the static loads are not important or do not need to be measured. In the case of the pitch link, the static and the dynamic loads are significant, and both need to be measured in order to obtain a reliable estimate of fatigue of that structure. However, one could use a piezoelectric strain gauge (as opposed to a foil strain gauge) to measure dynamic structural strains. The advantage of the piezoelectric strain gauges in systems which use energy harvesting systems is that no power is required for the sensing element. A separate piezoelectric element can be used to measure strain, as opposed to using the PZT energy harvesting element to provide both power and sensing functions. The reason for this is that the PZT used to provide power is generally a larger element, because it is designed to capture as much strain energy as is practical in the application, and therefore, is not well suited to discrete strain measurement locations. Furthermore, the PZT used for energy harvesting is loaded by other elements in the circuit, which may introduce some error in the strain measurement. Therefore, in the case where dynamic strain measurement only is required, an accurate and low power method of accomplishing this would be to substitute a piezoelectric strain gauge for the foil strain gauge at the input to the amplifier (pins 2 & 3 of connector JP2)

Obtaining units of microstrain from a bonded foil strain gauge is accomplished through the well known shunt calibration procedure, which entails placing a known resistance across one of the strain sensing elements and measuring the static response of the microelectronics to this shift in resistance. Provided that the sensitivity (gauge factor) of the strain gauges is known, and provided that the resistances of the bridge and shunt calibration resistance are known, one can calculate the amount of strain that is simulated by placing the shunt resistance across the strain gauge. This procedure allows the end user to convert from bits output from a strain sensor into physical units of microstrain. The sensitivity of the strain gauge electronics can be periodically tested using the built in shunt calibration facilities that are built into the circuit. If, with periodic shunt calibration tests, the sensitivity has changed dramatically, that result would indicate that some element in the amplification and signal conditioning chain has been compromised.

Furthermore, the built-in offset capabilities of the strain gauge circuit can be used to test for strain gauge stability. Therefore, the change in apparent offset on the strain gauge can be monitored over time. A shift in offset over time is likely an indication of either strain gauge debonding, or moisture ingress into the strain gauge.

In quarter bridge systems, offset shifts of the strain gauge towards increasing resistance would indicate fatigue of the strain gauge's elements. Offset shifts in the direction of reduced resistance reflect potential moisture ingress.

Moisture ingress into the strain gauge, PZT, and electronics elements can also be detected using a thin, integrated capacitive moisture sensor, such as we have described in our previous patent application, incorporated herein by reference, and entitled "Strain gauge with moisture barrier and self testing circuit", by Arms et al., U.S. patent application Ser. No. 11/091244 filed 28 Mar. 2005.

One concern that could be raised is that the ratio (Asg/Apzt) could appear to indicate a healthy sensing system in the case where the strain gauge is debonding or degrading while the PZT is simultaneously debonding or degrading. If these two separate elements should degrade in amplitude at the same rates, then the ratio (Asg/Apzt) would remain the same, and the measurement system would appear to be healthy even though it would be degrading. This problem can be overcome in two ways. One way would be to place the vehicle or aircraft in a known operating regime, such as straight and level flight at a relatively fixed airspeed and groundspeed. Under these conditions, the strain gauge's peak to peak amplitudes and the PZT's peak to peak amplitude could be recorded. If these amplitudes vary by some percentage below what was recorded after initial installation, then the system would indicate that degradation may have occurred.

Alternatively, one could monitor the average energy output of the PZT elements, such as the voltage on the storage elements of the energy harvesting circuit (Vbat), which reflects the amount of energy that has been collected by the system. Immediately after start-up, the system could take an initial measurement of Vbat. Then, after a programmable period of time, the system would make a second measurement of Vbat. The amount of energy stored between these two time periods may be calculated by the measured difference in voltages. The amount of energy consumed during this measurement period would be known, based on previous testing of the system for the operating conditions (sensor load, electronics load, harvester efficiency, etc.). If the average amount of energy stored was reduced, as determined by these built-in-tests, performed over a long period of time, then this reduction in energy produced would reflect PZT fiber breakage (degradation) or it would reflect PZT debonding from the substrate.

Another strategy for built-in-test would be to "ping" the PZT elements mounted on the component with enough electrical energy to create mechanical response in the component and a measurable strain response from the strain gauge. This response of the strain gauge could be characterized and any significant reduction in its magnitude would reflect strain gauge debonding. The advantage of this method is that it could be performed while the vehicle is not in operation. The disadvantage of this method is that energy must be supplied to the PZT in order to create a mechanical response (strain) in the component. Methods for exciting or "pinging" a piezo element have been previously described in the U.S. patent application Ser. No. 11/368,731, "Miniature Stimulating and Sensing System," ("the '731 application") to John Robb et al, filed Mar. 6, 2006, incorporated herein by reference.

Measuring Loads in Rotating Components

Strain gauges can be used to convert a structural element into a load or moment sensing element. In the case of the pitch link, four strain gauges may be arranged around the pitch link's cylindrical shaft to amplify tension & compression while cancelling out thermal effects and bending loads. These techniques for instrumenting a column element as a longitudinal force sensing element are well known (reference: Measurements Group, Inc., "Strain Gage Based Transducers, Their Design and Construction", pages 25-28, 1988).

The instrumented pitch link may be calibrated as a load sensing element. The easiest way to calibrate the instrumented pitch link would be to apply known loads using a reference load cell or weights. The known loads are related to the pitch link's output in bits, and these data may be stored locally (in the embedded electronics non-volatile memory) and/or remotely (on a nearby base station or on a server connected to the internet). In either case, these data would allow the end user to convert from bits output to actual working loads.

Application of Load Measurement for Condition Based Maintenance

The working pitch link loads during helicopter flight are very useful to acquire. These data can provide insight not only into fatigue of the pitch link, but to the overall severity of usage of the entire helicopter. Previous work, using strain gauges bonded to the pitch link, and slip rings to power and acquire data from the rotating components, have shown that pitch link loads increase significantly depending of the helicopter's flight regime. Since the pitch link is pinned to other structures (the pitch horn and the swash plate), the pitch link loads also provide insight into the loads borne by other structures on the machine. These connecting structures are also subject to cyclic fatigue, and their rate of fatigue depends on the severity of usage.

Packaging for the Energy Harvesting Wireless Pitch Link Sart Component

Figure 15A:
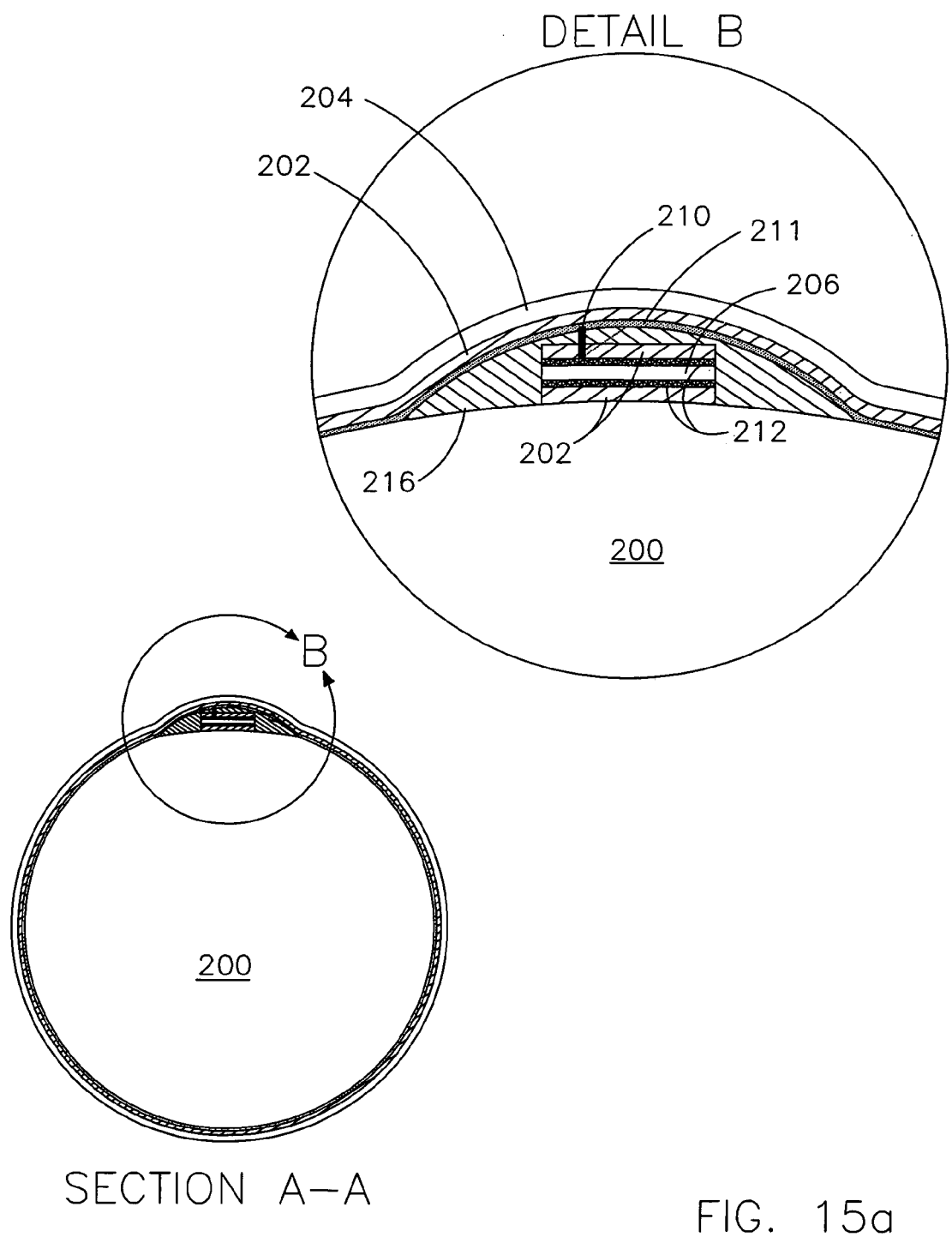
FIG. 15a is a cross sectional view of the mounting of the electronics of the present patent application on a helicopter pitch link showing protection from environment and mechanical stress.
Figure 15B:
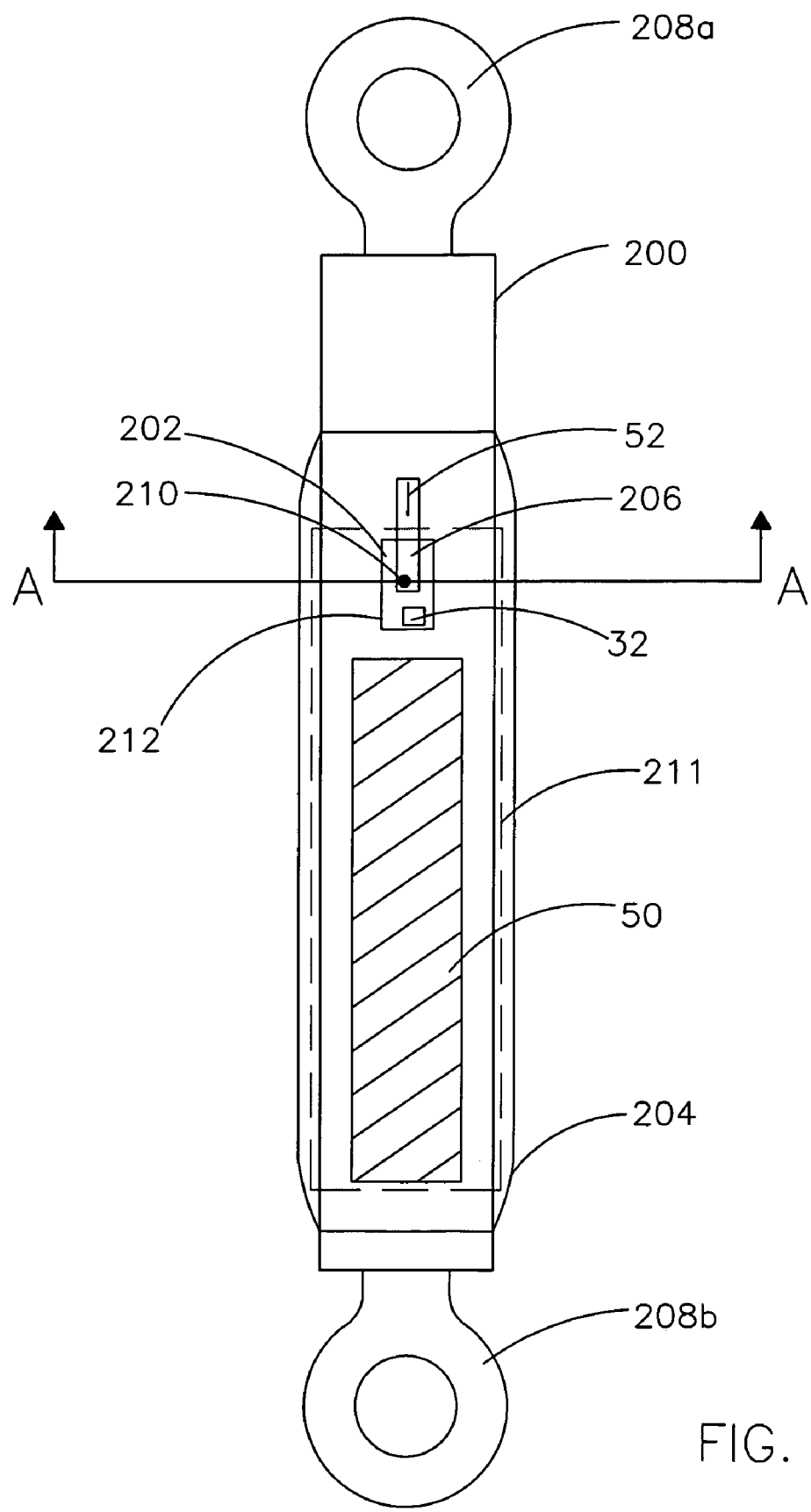

Our approach is to electromagnetically shield and environmentally protect our electronics assembly after direct epoxy bonding to pitch link 200. Polyurethane materials have been used to surround and protect by providing a tacky, conformal seal for our microelectronics, which prevents moisture ingress. Polyurethane material 202 is protected by a thick overcoat of elastomeric shrink tubing 204. This method is ideally suited to the pitch link application, as it secures the conformal polyurethane sealant material and provides excellent mechanical protection of our electronics module 206, RF antenna 52, strain sensing elements 32, and energy harvesting elements 50 after mounting to a slender cylindrical element, pitch link 200, as shown in FIGS. 15a, 15b.

The injectable polyurethane sealant (part number HT 3326-5, Aviation Devices and Electronic Components, AV-DEC, Fort Worth, Tex.) was originally designed for environmental sealing of electrical connectors. We determined that this type of conformal coating would be useful for environmental protection of the micro-electronics module, battery, and PZT harvester materials (after bonding of these elements to the pitch link).

Flexible sealants 202 can also be silicone rubber or the HT 3326-5 polyurethanes, and can provide good moisture protection, however, they remain soft and tacky after curing, and therefore, they require mechanical protection. Mechanical protection can be realized by subsequent application of heat shrinkable tubing (or cold shrink tubing). Heat shrink tubing 204 may be obtained with an integral conductive electromagnetic interference (EMI) screening (or "shielding") and/or hot melt adhesive (The Zippertubing Co., Los Angeles, Calif.). Zippertubing possesses an advantage over traditional heat shrink tubing because the pitch link rod ends 208a, 208b would not need to be removed to provide environmental protection for pitch link electronics.

An alternative for EMI protection (to using heat shrink tubing with integral EMI conductive screening) would be to use a pre-formed gasket 210 of tacky polyurethane (also from AV-DEC) which includes an integral EMI shield 211. Printed circuit board (PCB) 206 may be designed to accept this electrically conductive gasket 210 at an area where a ground reference may be made, and the pre-formed gasket 210 would be placed over this area, but with a layer of electrically insulative material 212 (such as thin polyimide sheet) to prevent electrical shorting in those areas of the PCB that need to be insulated from EMI shield 211. In this way, the PCB and other sensitive electrical components may be shielded from EMI without shielding the radio antenna (which would be part of the PCB) and without causing electrical shorting to occur.

An alternative to heat shrink tubing has also been procured, this is termed "cold shrink" tubing (3M Aerospace & Aircraft Maintenance Division, St. Paul, Minn.). Cold shrink tubing possesses the advantage of maintaining a constant compressive load over time (i.e., the material exhibits less creep and stress relation compared to heat shrink tubing). Cold shrink tubing, combined with the injectable polyurethane sealant, can provide excellent long term protection of the final pitch link load sensing assembly, including the strain/load sensors, microelectronics module with radio link, and energy harvester.

Additional protection from incidental impacts can be provided to the electronics by placing two vertical strips 216 of a tough polymer, such as solid polyamide or fiberglass, on either side of the slender rectangular PCB board, as shown in the attached figure. The cold shrink covers the strips, the PC board, and the component.

While the disclosed methods and systems have been shown and described in connection with illustrated embodiments, various changes may be made therein without departing from the spirit and scope of the invention as defined in the appended claims.

The invention claimed is:

1. A method of maintaining a structure comprising:
   a. providing a structure having a component subject to component failure;
   b. mounting a sensor module on the structure, said sensor module including a sensor, a memory and an energy harvesting device, wherein said sensor provides data related to loading, wherein said energy harvesting device is configured to convert at least one from the group consisting of vibration of the structure and strain of the structure into electricity;
   c. using said sensor and logging data derived from said sensor data related to loading in said memory, wherein said memory is powered solely with electricity derived from said energy harvesting device; and
   d. replacing said component if information derived from said data in said memory shows that said component experienced a load history indicating damaging usage.

2. A method as recited in claim 1, wherein said structure comprises a vehicle.

3. A method as recited in claim 2, wherein said vehicle comprises an aircraft.

4. A method as recited in claim 3, wherein said aircraft comprises a helicopter.

5. A method as recited in claim 1, wherein said component comprises a rotating part.

6. A method as recited in claim 5, wherein said component comprises a helicopter pitch link.

7. A method as recited in claim 1, wherein said sensor includes at least one from the group including a strain gauge and a piezoelectric transducer.

8. A method as recited in claim 7, wherein said strain gauge includes a triaxial strain gauge, further comprising providing a programmable triaxial strain gauge signal conditioner with integral self calibration.

9. A method of operating a system as recited in claim 1, wherein said sensor includes at least one from the group consisting of an inertial sensing suite and a GPS.

10. A method as recited in claim 1, wherein said sensor module further includes a processor.

11. A method as recited in claim 10, wherein said sensor module further includes a wireless communications device, wherein said processor is connected for controlling operation of said wireless communication device.

12. A method as recited in claim 10, wherein said sensor module further includes a plurality of sensors and a multiplexer, wherein said multiplexer is connected to provide data derived from said plurality of sensors to said processor.

13. A method of operating a system as recited in claim 10, further comprising using said processor to perform calculations and further comprising providing at least one communications scheme from the group consisting of a wireless communications device and a wired external connection, and further comprising transmitting results of said calculations with said at least one communications scheme.

14. A method as recited in claim 10, wherein said memory includes a volatile memory portion and a non-volatile memory portion.

15. A method as recited in claim 14, further comprising providing data directly from said sensor to said volatile memory portion and then transferring said data to said non-volatile memory.

16. A method as recited in claim 10, wherein said sensor module further includes a low power time keeper, wherein said processor is capable of sleep mode, further comprising providing a periodic signal to said processor from said low power time keeper for waking said processor from said sleep mode.

17. A method of operating a system as recited in claim 16, wherein said sleep mode includes power to said processor being turned off during time between said periodic signals.

18. A method of operating a system as recited in claim 16, further comprising providing burst mode sampling data from said sensor.

19. A method of operating a system as recited in claim 18, wherein said sensor module further includes a wireless communications device, further comprising buffering data acquired in said burst mode sampling before transmitting said data with said wireless communication device.

20. A method of operating a system as recited in claim 16, further comprising an amplifier, wherein during said waking said processor said amplifier is kept out of saturation.

21. A method of operating a system as recited in claim 1, wherein said sensor module further includes a wireless communications device, and further comprising transmitting data derived from said sensor with said wireless communications device, wherein all power for powering said wireless communications device is derived from said energy harvesting device.

22. A method of operating a system as recited in claim 21, wherein said wireless communication device includes an IEEE 802.15.4 transceiver.

23. A method of operating a system as recited in claim 1, further comprising mounting a plurality of said sensor modules on the structure, further comprising providing a wired network, wherein said wired network connects said plurality of sensor modules.

24. A method of operating a system as recited in claim 1, wherein said sensor wirelessly communicates data for logging data to said memory.

25. A method of operating a system as recited in claim 1, further comprising connecting an actuator to said sensor module.

26. A method of operating a system as recited in claim 25, wherein said actuator is connected for providing a signal to said structure for material testing.

27. A method of operating a system as recited in claim 13, further comprising providing encryption to said information before transmitting.

28. A method of operating a system as recited in claim 1, further comprising providing a warning to said information before transmitting.

29. A method of operating a system as recited in claim 1, wherein said sensor module is one in a network of sensor modules.

30. A method of operating a system as recited in claim 29, wherein said network of sensor modules is arranged in a mesh network.

31. A method as recited in claim 1, wherein said sensor module further includes a rechargeable battery connected for recharging from said energy harvesting device.

32. A method of operating a system as recited in claim 1, wherein said load history indicating damaging usage includes a load exceeding a threshold.

33. A method of operating a system as recited in claim 1, wherein said load history indicating damaging usage includes fatigue inducing cyclic loading.

34. A method as recited in claim 1, further comprising a plurality of said sensor modules, wherein each said sensor module further includes a time keeper and a two-way communications scheme, wherein each said sensor module is a member of a network, further comprising transmitting a signal for synchronizing said time keepers.

35. A method as recited in claim 34, wherein said two-way communications scheme includes two-way wireless communication.

36. A method as recited in claim 1, wherein said information includes accumulated damage.

37. A method as recited in claim 1, wherein said information shows that said component experienced fatigue.

38. A method as recited in claim 1, further comprising adjusting operation of said structure based on said information.

39. A method as recited in claim 1, wherein said sensor includes a strain gauge calibrated to provide at least one from the group consisting of load and moment.

40. A method of operating a system as recited in claim 1, wherein said using said sensor and logging data derived from said sensor for obtaining said load history indicating damaging usage includes burst mode sampling.

41. A sensing system as recited in claim 40, wherein duty cycle of said burst mode sampling is based on energy available.

42. A method of operating a system as recited in claim 33, wherein said using said sensor and logging data derived from said sensor for obtaining said load history indicating damaging usage includes burst mode sampling.

43. A sensing system as recited in claim 42, wherein duty cycle of burst mode sampling is based on energy available.

44. A method of operating a structure comprising:
 a. providing a structure having a component subject to component failure;
 b. mounting a sensor module to said structure for measuring a parameter related to component failure, wherein said sensor module includes a sensor, a wireless communication device and an energy harvesting device, wherein said sensor provides data related to loading, wherein said energy harvesting device is configured to convert at least one from the group consisting of vibration of the structure and strain of the structure into electricity;
 c. acquiring data related to loading with said sensor;
 d. providing information derived from said data to said wireless communication device;
 e. powering said wireless communications device solely with electricity derived from said energy harvesting device;
 f. transmitting said information with said wireless communication device; and
 g. using said information to adjust operation of said structure so as to avoid damaging usage.

45. A method of operating a system as recited in claim 44, further comprising providing a warning if said information shows that said component is subject to damaging usage.

46. A method of operating a system as recited in claim 44, wherein said damaging usage includes a load exceeding a threshold.

47. A method of operating a system as recited in claim 44, wherein said damaging usage includes fatigue inducing cyclic loading.

48. A method of operating a system as recited in claim 44, further comprising using said information to set a time for maintaining said structure.

49. A sensing system as recited in claim 44, wherein said energy harvesting system is configured to convert at least one from the group consisting of vibration and strain of the structure into electricity.

50. A method of operating a structure comprising,
 a. providing a structure having a component subject to component failure;
 b. mounting a sensor, a memory and an energy harvesting device on the structure, wherein said sensor provides data related to loading, wherein said energy harvesting device is configured to convert at least one from the group consisting of vibration of the structure and strain of the structure into electricity;
 c. using said sensor and logging data derived from said sensor in said memory, wherein said memory is powered solely with electricity derived from said energy harvesting device; and
 d. using information in said memory to adjust operation of said structure so as to avoid damaging usage.

51. A method as recited in claim 50, further comprising replacing said component when information in said memory shows said component experienced damaging use.

52. A method as recited in claim 50, wherein said sensor provides information about load on said component.

53. A sensing system as recited in claim 50, wherein said energy harvesting system is configured to convert at least one from the group consisting of vibration and strain of the structure into electricity.

54. A system comprising, a network of sensor nodes wherein each said sensor node includes a sensor, a processor, a memory, a low power time keeper, a wireless communication device, and an energy harvesting device, wherein said sensor provides data related to loading, wherein said processor is connected to receive data derived from said sensor, wherein said memory is connected for storing data derived from said sensor, wherein said low power time keeper is connected to periodically provide a signal to wake said processor from a sleep mode, wherein said wireless communication device is connected for communicating data derived from said sensor, wherein said energy harvesting device is configured to convert at least one from the group consisting of vibration and strain into electricity, and wherein said energy harvesting device is connected for providing said electricity to power said processor, said memory, and said wireless communications device wherein all electricity for powering said wireless communications device is derived from said energy harvesting device, wherein said memory includes a program to track accumulated damage from repeated instances of said loading.

55. A method of operating a system comprising:
 a. providing a sensor node including a sensor, a processor, a memory, a low power time keeper, a wireless communication device, and an energy harvesting device, wherein said sensor provides data related to loading, wherein said energy harvesting device is configured to convert at least one from the group consisting of vibration and strain into electricity;
 b. providing a signal from said low power time keeper to said processor to power up said processor from a powered off or a low powered condition at predetermined intervals of time;
 c. using energy derived from said energy harvesting device to provide power for operating at least one electronic device from the group consisting of said processor, said memory, and said wireless communications device;
 d. providing data derived from said sensor to said processor;
 e. storing data derived from said sensor in said memory;
 f. using said wireless communication device to externally communicate data derived from said sensor; and
 g. using the data stored in memory to determine accumulated damage from repeated instances of said loading.

56. A method of operating a system as recited in claim 55, wherein power is turned off between said intervals of time.

57. A method of operating a system as recited in claim 55, wherein said sensor node is mounted on a structure, further comprising using data derived from said sensor to set a time for maintaining said structure.

58. A structure, comprising a wireless instrumented structural component including a first sensor, a second sensor, a processor, a transmitter, and an energy harvesting device, wherein said first sensor is for measuring a first property related to load in said structural component, wherein said second sensor is for measuring a second property related to load in said structural component, wherein said first property differs from said second property, wherein said transmitter is connected to transmit data derived from at least one from the group consisting of said first sensor and said second sensor about load in said structural component, wherein all electricity for powering said transmitter is derived from said energy harvesting device, wherein said energy harvesting device is configured to convert at least one from the group consisting of vibration of the structure and strain of the structure into electricity, and wherein said processor is connected to receive an output derived from said second sensor for testing operation of said first sensor.

59. A structure as recited in claim 58, wherein said first sensor includes a strain gauge.

60. A structure as recited in claim 58, wherein said second sensor includes a piezoelectric transducer.

61. A structure as recited in claim 60, wherein said energy harvesting device includes said piezoelectric transducer.

62. A structure as recited in claim 58, further comprising a rechargeable battery connected for recharging from said energy harvesting device.

63. A structure as recited in claim 58, wherein said structural component comprises an aircraft part.

64. A structure as recited in claim 58, wherein said structural component comprises a helicopter part.

65. A method as recited in claim 58, wherein said data includes at least one from the group consisting of strain, load, remaining life, accumulated damage, and peak data.

66. A method as recited in claim 58, wherein said data includes a ratio of strain amplitude to piezoelectric amplitude.

67. A method of using a structure, comprising
   a. providing a wireless instrumented structural component mounted to the structure, wherein said wireless instrumented structural component includes a first sensor, a second sensor, a transmitter, and an energy harvesting device, wherein said first sensor is for measuring a first property related to load in said structural component, wherein said second sensor is for measuring a second property related to load in said structural component, wherein said first property differs from said second property, and wherein said energy harvesting device is configured to convert at least one from the group consisting of vibration of the structure and strain of the structure into electricity;
   b. comparing data from said first sensor with data from said second sensor to test operation of said first sensor;
   c. providing energy from said energy harvesting device wherein all power for powering said transmitter is derived from said energy harvesting device; and
   d. wirelessly transmitting data about load in said structural component.

68. A method as recited in claim 67, wherein said first sensor comprises a strain gauge and said second sensor comprises a piezoelectric transducer.

69. A method as recited in claim 68, wherein said comparing includes a ratio of strain gauge amplitude with piezoelectric transducer amplitude.

70. A method as recited in claim 68, wherein said strain gauge amplitude is a peak to peak amplitude and wherein said piezoelectric transducer amplitude is a peak to peak amplitude.

71. A method as recited in claim 68, further comprising providing a moisture sensor, further comprising using output of said moisture sensor to provide a check of said strain gauge data.

72. A method as recited in claim 67, further comprising providing an energy storage device connected for storing energy from said energy harvesting device.

73. A method as recited in claim 67, further comprising measuring charge on said energy storage device.

74. A method as recited in claim 67, further comprising detecting a problem with said energy harvesting device from said charge on said energy storage device.

75. A method as recited in claim 67, wherein said second sensor includes said energy harvesting device.

76. A method as recited in claim 67, further comprising providing a receiving device for receiving said data, and further comprising providing a plurality of said wireless instrumented structural components mounted to the structure, wherein said receiving device receives data from said plurality of said wireless instrumented structural components mounted to the structure.

77. A method as recited in claim 76, further comprising determining usage of the structure from said received data.

78. A method as recited in claim 76, wherein said receiving device is located on the structure.

79. A method as recited in claim 67, further comprising providing a rechargeable battery and charging said rechargeable battery with said energy harvesting device.

80. A method of estimating time before failure of a component of a structure, comprising:
   a. providing the structure having the component;
   b. instrumenting said structure with a sensor and a memory, said sensor to measure a parameter related to loading of the structure, said memory for logging data derived from said sensor;
   c. providing an energy harvesting device on the structure, wherein said energy harvesting device is configured to convert at least one from the group consisting of vibration of the structure and strain of the structure into electricity, wherein said energy harvesting device is connected to provide all power for powering logging data;
   d. providing a mathematical model of the component subject to failure;
   e. entering information derived from said data into said model; and
   f. using said mathematical model and said information to estimate a parameter related to time before failure of said component.

81. A method as recited in claim 80, further comprising providing maintenance based on said estimated time.

82. A method as recited in claim 80, wherein said parameter related to the structure includes a parameter related to input load experienced by the structure and wherein said using said mathematical model involves estimating a parameter related to time before structural component fatigue.

83. A method as recited in claim 80, further comprising instrumenting said structure with a plurality of said sensors.

84. A method as recited in claim 80, wherein said sensor includes a strain sensor.

85. A method as recited in claim 84, wherein said mathematical model includes empirical data relating strain and cycles to failure.

86. A method as recited in claim 84, wherein said mathematical model includes an algorithm relating strain in one location to strain in another location.

87. A method as recited in claim 84, wherein said mathematical model relates strain to load.

88. A method as recited in claim 87, wherein said mathematical model includes an algorithm relating load in one location to load in another location.

89. A method as recited in claim 80, further comprising a wireless transmitter connected for transmitting at least one from the group consisting of said data and said information.

90. A method as recited in claim 89, wherein said data includes strain.

91. A method as recited in claim 90, wherein said data includes time when a data point was logged.

92. A method as recited in claim 89, wherein said information includes peaks and valleys of cycles of strain.

93. A method of collecting information about a structure, comprising:
  a. providing an instrumented component including a sensor, a memory, and an energy harvesting device, wherein said instrumented component is an integral part of a structure when installed in the structure, wherein said instrumented component includes packaging to protect said sensor, said memory, and said energy harvesting device, wherein said sensor provides data related to loading, wherein said energy harvesting device is configured to convert at least one from the group consisting of vibration of the structure and strain of the structure into electricity;
  b. installing said instrumented component in the structure; and
  c. using energy derived from said energy harvesting device to provide power for logging data in said memory.

94. A method as recited in claim 93, wherein said packaging provides environmental protection.

95. A method as recited in claim 93, wherein said packaging provides shielding from electromagnetic field.

96. A method as recited in claim 95, wherein said packaging provides an environmental protection material, further comprising an antenna extending outside said shielding and inside said environmental protection material.

97. A method of maintaining a structure comprising,
  a. providing a structure having a component subject to component failure;
  b. mounting a sensor, a memory and an energy harvesting device on the structure, wherein said energy harvesting device is configured to convert at least one from the group consisting of vibration of the structure and strain of the structure into electricity;
  c. using said sensor and logging data derived from said sensor in said memory, wherein said memory is powered solely with energy derived from said energy harvesting device;
  d. automatically adjusting sampling rate to log data at a rate depending on amount of energy harvested by said energy harvesting device.

98. A method as recited in claim 97, wherein said rate depends on magnitude of strain experienced by the structure.

* * * * *